(12) United States Patent
Koreeda et al.

(10) Patent No.: US 10,295,764 B2
(45) Date of Patent: May 21, 2019

(54) CONNECTOR DEVICE AND PLUG CONNECTOR

(71) Applicant: JAPAN AVIATION ELECTRONICS INDUSTRY, LIMITED, Shibuya-ku, Tokyo (JP)

(72) Inventors: Yuichi Koreeda, Tokyo (JP); Masaki Ishiguro, Tokyo (JP); Hideto Shimazu, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 15/988,784

(22) Filed: May 24, 2018

(65) Prior Publication Data

US 2019/0049678 A1   Feb. 14, 2019

(30) Foreign Application Priority Data

Aug. 8, 2017  (JP) .................................. 2017-153261

(51) Int. Cl.
G02B 6/42 (2006.01)

(52) U.S. Cl.
CPC ......... *G02B 6/4261* (2013.01); *G02B 6/4224* (2013.01); *G02B 6/4292* (2013.01)

(58) Field of Classification Search
CPC ........ H01R 13/46; H01R 13/629; G02B 6/32; G02B 6/40; G02B 6/4224; G02B 6/4261; G02B 6/4277; G02B 6/4292; G02B 6/4225; G02B 6/4415

USPC ...................................................... 385/75–87
See application file for complete search history.

(56) References Cited

U.S. PATENT DOCUMENTS

| 8,747,159 | B2 | 6/2014 | Liu et al. | |
|---|---|---|---|---|
| 8,920,044 | B2 | 12/2014 | Shimazu et al. | |
| 2009/0111304 | A1* | 4/2009 | Hayden, Sr. ........... | H01R 12/57 439/271 |
| 2013/0210275 | A1* | 8/2013 | Fish .................... | H01R 13/6658 439/620.01 |

(Continued)

FOREIGN PATENT DOCUMENTS

| JP | 2005056615 A | 3/2005 |
|---|---|---|
| JP | 2010010030 A | 1/2010 |

(Continued)

*Primary Examiner* — Michael P Mooney
(74) *Attorney, Agent, or Firm* — Holtz, Holtz & Volek PC

(57) ABSTRACT

A plug connector is provided with a photoelectric conversion portion, a first electric connector and a first lock portion. The first electric connector inputs and outputs electric signals into and from the photoelectric conversion portion. The first lock portion and the first electric connector are apart from each other by a first distance. A receptacle connector is provided with a second lock portion and a second electric connector. When the plug connector and the receptacle connector are mated with each other, the second lock portion engages with the first lock portion, and the second electric connector is connected to the first electric connector. The second lock portion and the second electric connector are apart from each other by a second distance. A difference between the first distance and the second distance is equal to or less than an effective contact length between the first electric connector and the second electric connector.

11 Claims, 21 Drawing Sheets

(56) References Cited

U.S. PATENT DOCUMENTS

2013/0294731 A1* 11/2013 Van Der Mee ...... G02B 6/4201
  385/76

FOREIGN PATENT DOCUMENTS

| JP | 2013101928 A | 5/2013 |
| JP | 2014026134 A | 2/2014 |

* cited by examiner

CONNECTOR DEVICE AND PLUG CONNECTOR

CROSS REFERENCE TO RELATED APPLICATIONS

This application is based on and claims priority under 35 U.S.C. § 119 to Japanese Patent Application No. JP2017-153261 filed Aug. 8, 2017, the contents of which are incorporated herein in their entirety by reference.

BACKGROUND OF THE INVENTION

This invention relates to a connector device, particularly, to a connector device, which is used to connect an optical cable to an electronic device, and a plug connector included therein.

JP2014-26134A (Patent Document 1) discloses a connector connection unit (connector device) which is provided with a plug (plug connector) and a receptacle (receptacle connector). As shown in FIG. 33, the plug 900 of Patent Document 1 is attached to an end portion of an optical cable 920. In detail, the plug 900 has an optical connector main unit 902 attached to the end portion of the optical cable 920. The plug 900 further has a housing 904 holding the optical connector main unit 902, an inner shell 906 attached to the housing 904 and an outer shell 908. On the other hand, the receptacle 910 is attached to a case (not shown) of an electronic device (not shown). The receptacle 910 has a mating optical connector 912, which is connected to the optical connector main unit 902 when the receptacle 910 is mated with the plug 900. The receptacle 910 further has an optical transceiver 914 mounted on a board 930 accommodated in the case and a case shell 916 fixed to the case. In a state that the plug 900 and the receptacle 910 are mated with each other, the optical transceiver 914 converts an optical signal transmitted through the optical cable 920 and an electric signal transmitted through a wiring (not shown) of the board 930 to each other.

In the connector connection unit of Patent Document 1, the optical transceiver 914 is directly mounted on the board 930. Accordingly, the optical transceiver 914 is hard to be replaced when it is out of order. In order to ease replacement of the optical transceiver, a combination of an electric connector to be mounted on a board and an optical module formed to be insertable to and removable from the electric connector has already been developed. JP2005-56615A (Patent Document 2) discloses an electric connector used in such a combination. As shown in FIG. 34, the electric connector 950 of Patent Document 2 is provided with an electric connector body 952 mounted on a board 960 and shells 954 and 956 surrounding the electric connector main unit 952.

SUMMARY OF THE INVENTION

An optical module to be connected to the electric connector main unit 952 of Patent Document 2 is provided with another electric connector (first electric connector) to be connected to the electric connector main unit 952. In a state that the first electric connector and the electric connector main unit (second electric connector) 952 are appropriately connected to each other, almost the whole of the optical module is located inside a case of an electronic device. Accordingly, heat generated by the optical module is radiated into the case of the electronic device to increase a temperature of the inside of the case. Increase of the temperature in the case can cause failure and malfunction of the electronic device. Moreover, with increase of signal transmission speed in recent years, an operation speed of the optical module is increased, and a heating value of the optical module is increased too.

It is an object of the present invention to provide a connector device of which an optical module is arranged outside a case of a device.

In a case where the optical module is intended to be provided outside the case of the device or to a plug connector, it becomes difficult to carry out alignment and confirmation of connection establishment between a first connector provided to the optical module and a second connector provided to a receptacle connector or located in the case of the device.

Therefore, the present invention limits structural conditions to facilitate the alignment and the confirmation of the connection establishment between the first electric connector of the plug connector and the second electric connector of the receptacle connector.

One aspect of the present invention provides a connector device comprising a plug connector and a receptacle connector which are mateable with each other along a mating direction. The plug connector comprises a cable-holding portion, a photoelectric conversion portion, a first electric connector and a first lock portion. The cable-holding portion holds an optical fiber cable which transmits an optical signal. The first electric connector inputs and outputs electric signals into and from the photoelectric conversion portion. The photoelectric conversion portion converts the optical signal and the electric signal to each other. The first lock portion and the first electric connector are apart from each other by a first distance in the mating direction. The receptacle connector comprises a second lock portion and a second electric connector. The second lock portion engages with the first lock portion when the plug connector and the receptacle connector are mated with each other. The second electric connector is connected to the first electric connector when the plug connector and the receptacle connector are mated with each other. The second lock portion and the second electric connector are apart from each other by a second distance in the mating direction. The first electric connector and the second electric connector have an effective contact length therebetween in the mating direction. A difference between the first distance and the second distance is equal to or less than the effective contact length.

Another aspect of the present invention provides a plug connector mateable, along a mating direction, with a receptacle connector which comprises a mating lock portion and a mating electric connector. The plug connector comprises a cable-holding portion, a photoelectric conversion portion, an electric connector and a lock portion. The cable-holding portion holds an optical fiber cable which transmits an optical signal. The electric connector inputs and outputs electric signals into and from the photoelectric conversion portion. The photoelectric conversion portion converts the optical signal and the electric signal to each other. The lock portion and the electric connector are apart from each other by a first distance in the mating direction. The lock portion engages with the mating lock portion when the plug connector and the receptacle connector are mated with each other. The electric connector is connected to the mating electric connector when the plug connector and the receptacle connector are mated with each other. The electric connector and the mating electric connector have an effective contact length therebetween in the mating direction. When the mating lock portion and the mating electric connector have a second distance therebetween in the mating direction, a difference therebetween the first distance and the second distance is equal to or less than the effective contact length.

In the present invention, the first lock portion and the first electric connector of the plug connector are apart from each other by the first distance in the mating direction, and the second lock portion and the second electric connector of the receptacle connector are apart from each other by the second distance in the mating direction. Then, the difference between the first distance and the second distance is equal to or less than the effective contact length between the first electric connector and the second electric connector. In other words, the first distance and the second distance are set to satisfy such conditions. Out of these, the first distance may be unintentionally decided at a design stage for the plug connector. However, when the second distance, which can be intentionally designed in various values, is unintentionally decided, assembly variation is caused as described in paragraph 0056 of Patent Document 1. Since the aforementioned structural conditions are set in consideration to this point, the connector device of the present invention can easily carry out the alignment and confirmation of the connection establishment between the first electric connector and the second electric connector.

An appreciation of the objectives of the present invention and a more complete understanding of its structure may be had by studying the following description of the preferred embodiment and by referring to the accompanying drawings.

Figure 1:
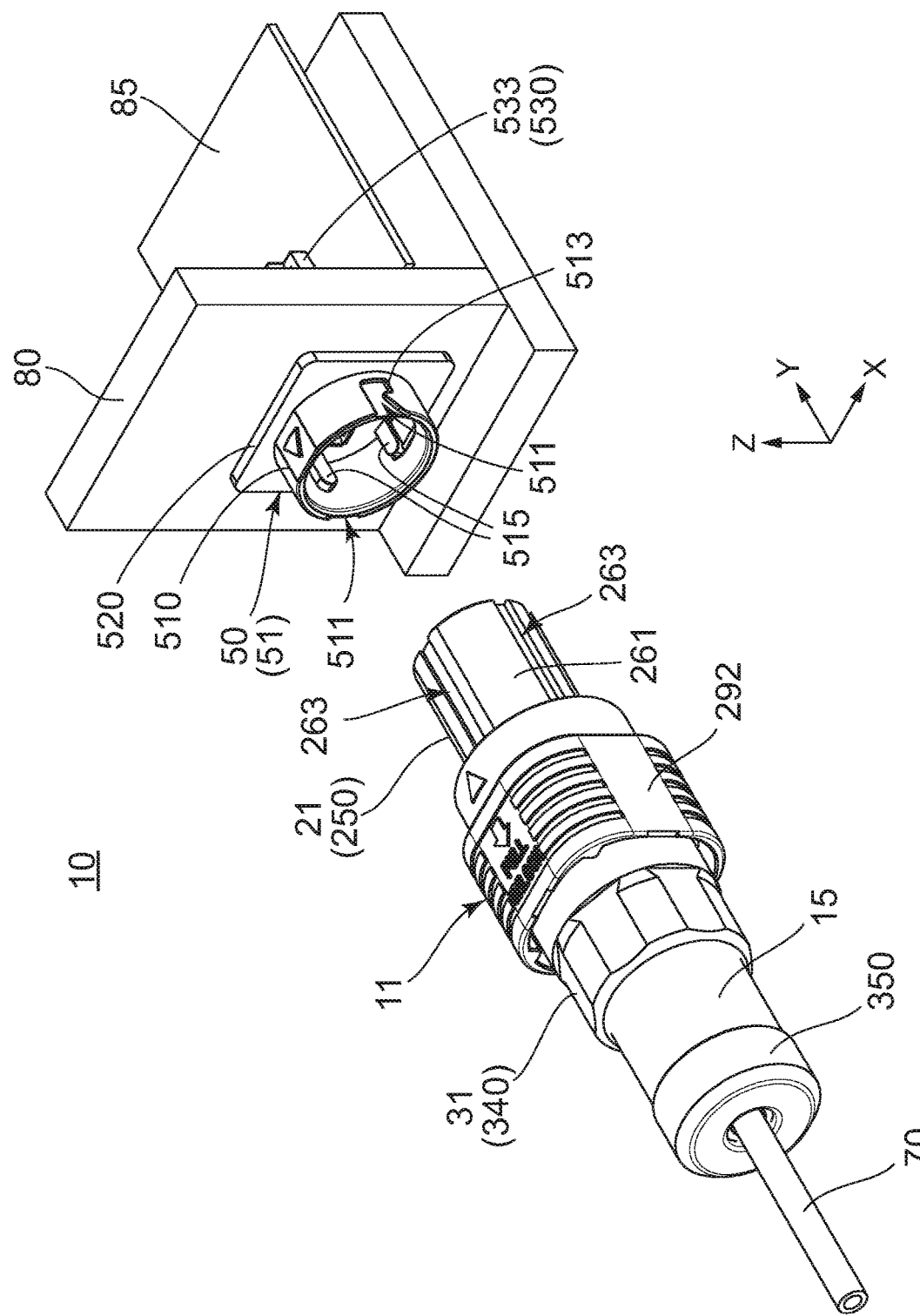
FIG. 1 is a perspective view showing a connector device according to an embodiment of the present invention. A receptacle is fixed to a case while a cage and a second electric connector are mounted on a circuit board. A plug connector and a receptacle connector are not yet mated with each other.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
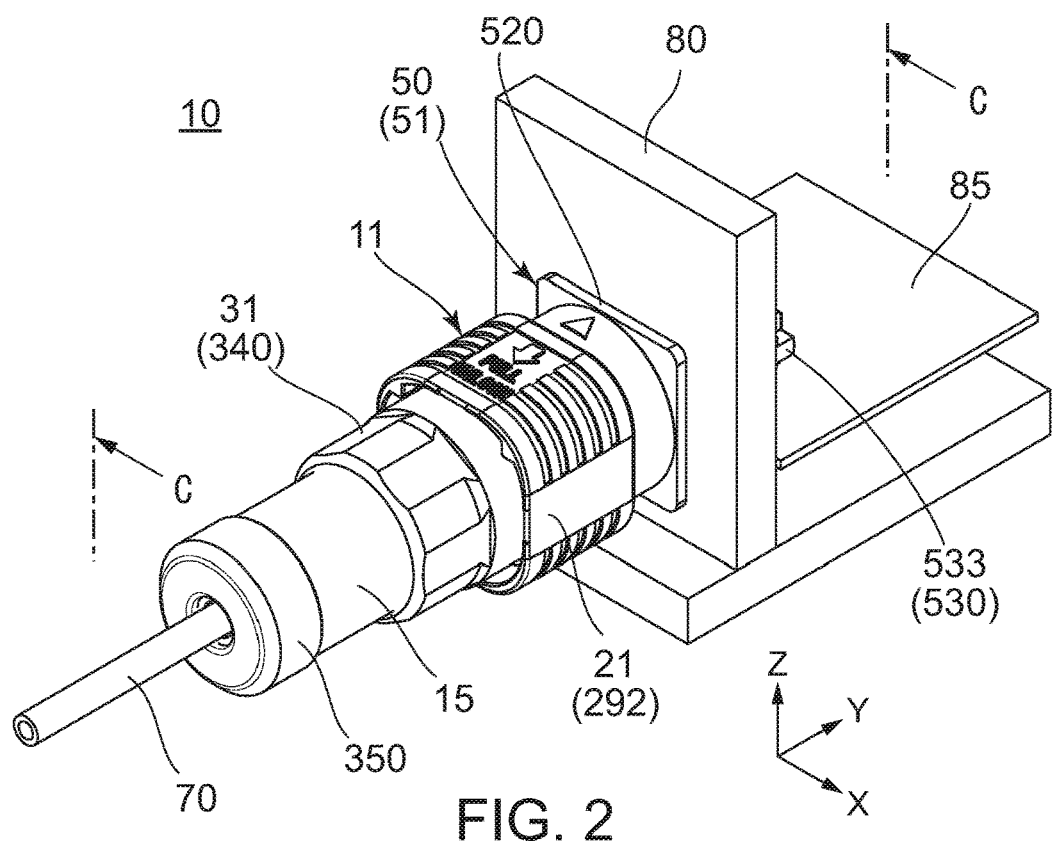
FIG. 2 is another perspective view showing the connector device of FIG. 1. The plug connector and the receptacle connector are mated with each other.

Referring to FIGS. 1 and 2, a connector device 10 according to an embodiment of the present invention is provided with a plug connector 11 and a receptacle connector 50. The plug connector 11 is attached to an end portion of an optical fiber cable 70. The receptacle connector 50 is attached to a case 80 of an electronic device (not shown) and a circuit board 85.

As understood from FIGS. 1 and 2, the plug connector 11 and the receptacle connector 50 are mateable with and detachable from each other along a mating direction. In the present embodiment, the mating direction is a direction extending along a front-rear direction, and the front-rear direction is a Y-direction. Moreover, a positive Y-direction is directed forward while a negative Y-direction is directed rearward.

Figure 3:
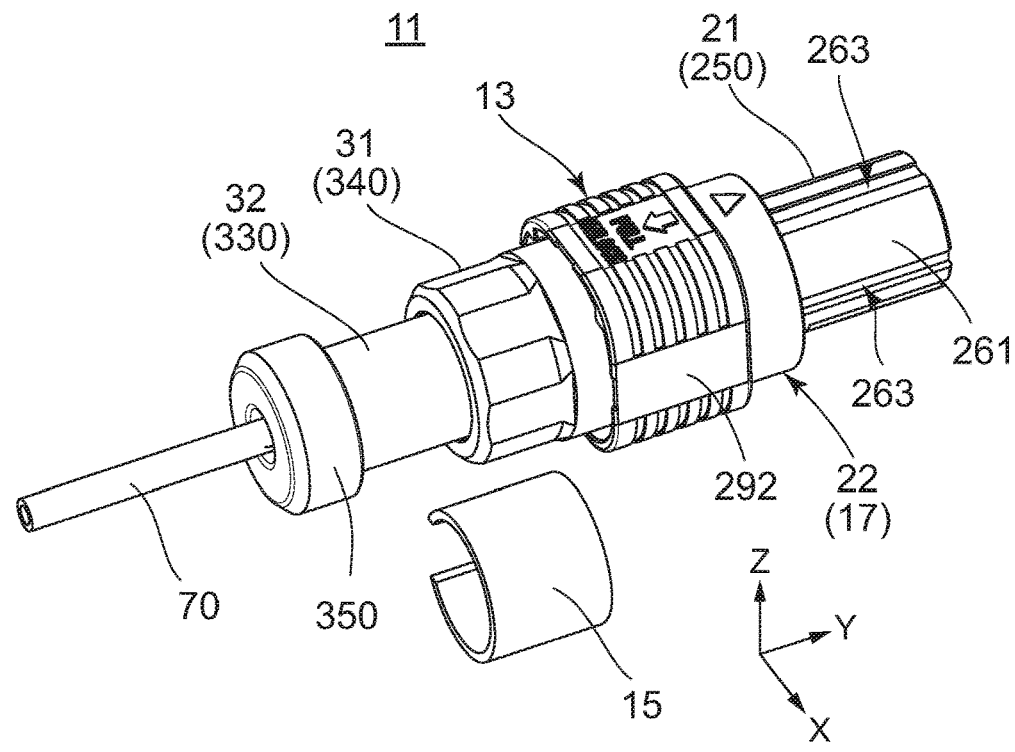
FIG. 3 is a perspective view showing the plug connector included in the connector device of FIG. 1. A stopper is detached from a plug connector main unit.

Referring to FIG. 3, the plug connector 11 has a plug connector main unit 13 and a stopper 15. The stopper 15 has a shape of a cylinder a part of which is cut off. In detail, the stopper 15 has a C-shape when seen along the front-rear direction, and it extends along the front-rear direction. The stopper 15 is resiliently deformable to vary a distance between two end portions thereof in a circumferential direction. Use of this resilient deformation allows the stopper 15 to be attachable to and detachable from the plug connector main unit 13.

Figure 4:
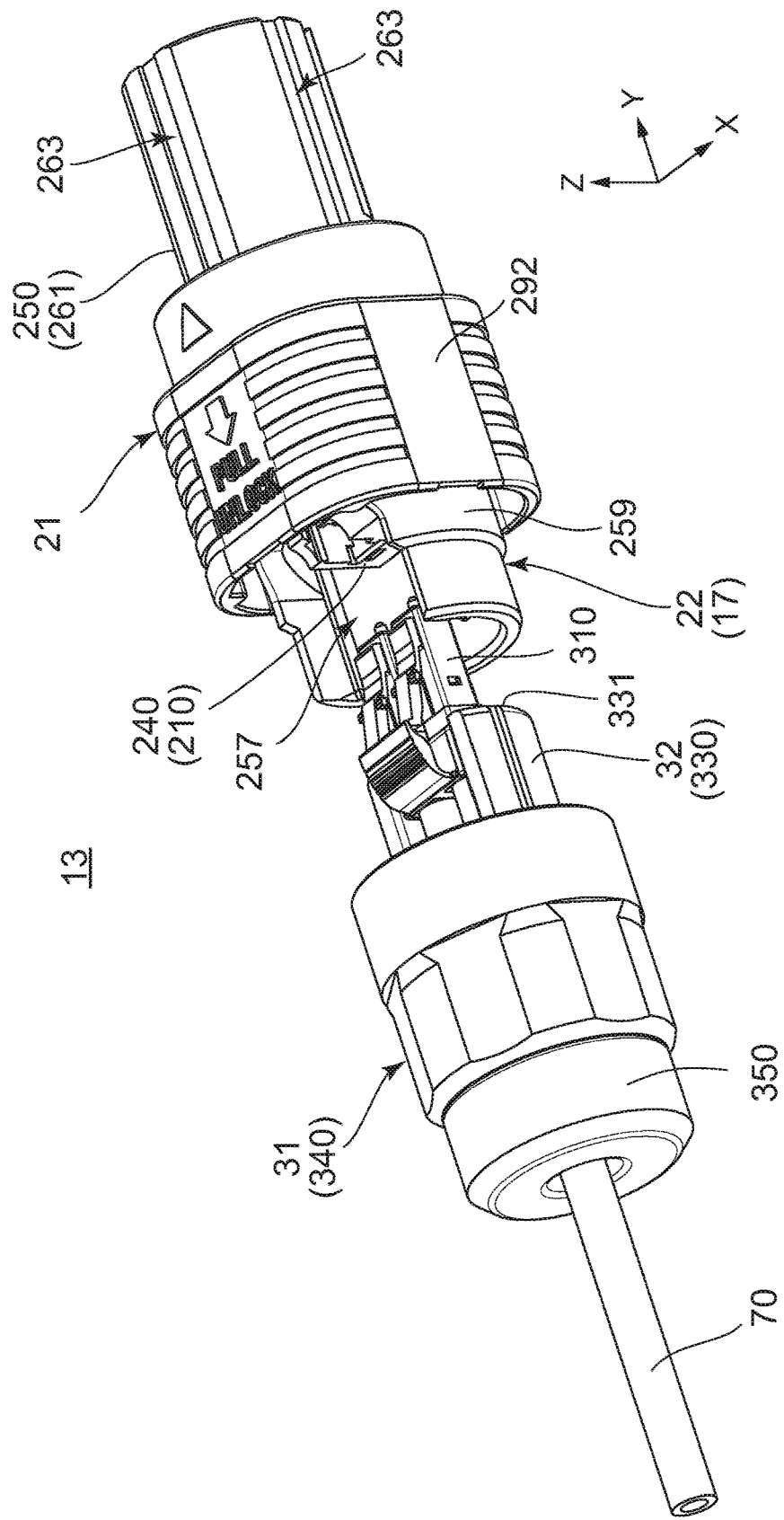
FIG. 4 is a perspective view showing the plug connector main unit included in the plug connector of FIG. 3. A front portion and a rear portion are separated from each other.

As shown in FIG. 4, the plug connector main unit 13 has a front portion 21 and a rear portion 31. As understood from FIGS. 4 and 5, the front portion 21 and the rear portion 31 are attachable to and detachable from each other along the front-rear direction. As understood from FIGS. 5 and 6, the rear portion 31 has a coupling nut 340 which is movable along the front-rear direction. The coupling nut 340 fastens the front portion 21 and the rear portion 31 to each other. The stopper 15 (see FIG. 3) is attached to the rear portion 31 of the plug connector main unit 13 to regulate rearward movement of the coupling nut 340.

Referring to FIGS. 6 to 10, the front portion 21 of the plug connector main unit 13 is provided with an optical module 210, a front holder 250, a support member 270, a lock ring 280, a lock spring 290 and an operation portion 292. Moreover, the rear portion 31 of the plug connector main unit 13 is provided with an optical connector 310, a cable-holding portion 320, a rear holder 330, the coupling nut 340 and a rear cup 350. In the present embodiment, the front holder 250, the support member 270, the lock ring 280, the lock spring 290, the operation portion 292 and the rear holder 330 form a first shell 17. In detail, the first shell 17 is provided with a first member 22 holding the optical module 210 and a second member 32 holding the optical connector 310. The first member 22 consists of the front holder 250, the support member 270, the lock ring 280, the lock spring 290 and the operation portion 292. The second member 32 consists of the rear holder 330. As just described, the plug connector 11 is provided with the optical connector 310, the optical module 210 and the first shell 17. Moreover, the plug connector 11 is also provided with the coupling nut 340 to fasten the first member 22 and the second member 32 to each other. In a state before the first member 22 and the second member 32 are fastened to each other, the coupling nut 340 is attached to the second member 32 to be movable along the front-rear direction.

Figure 9:
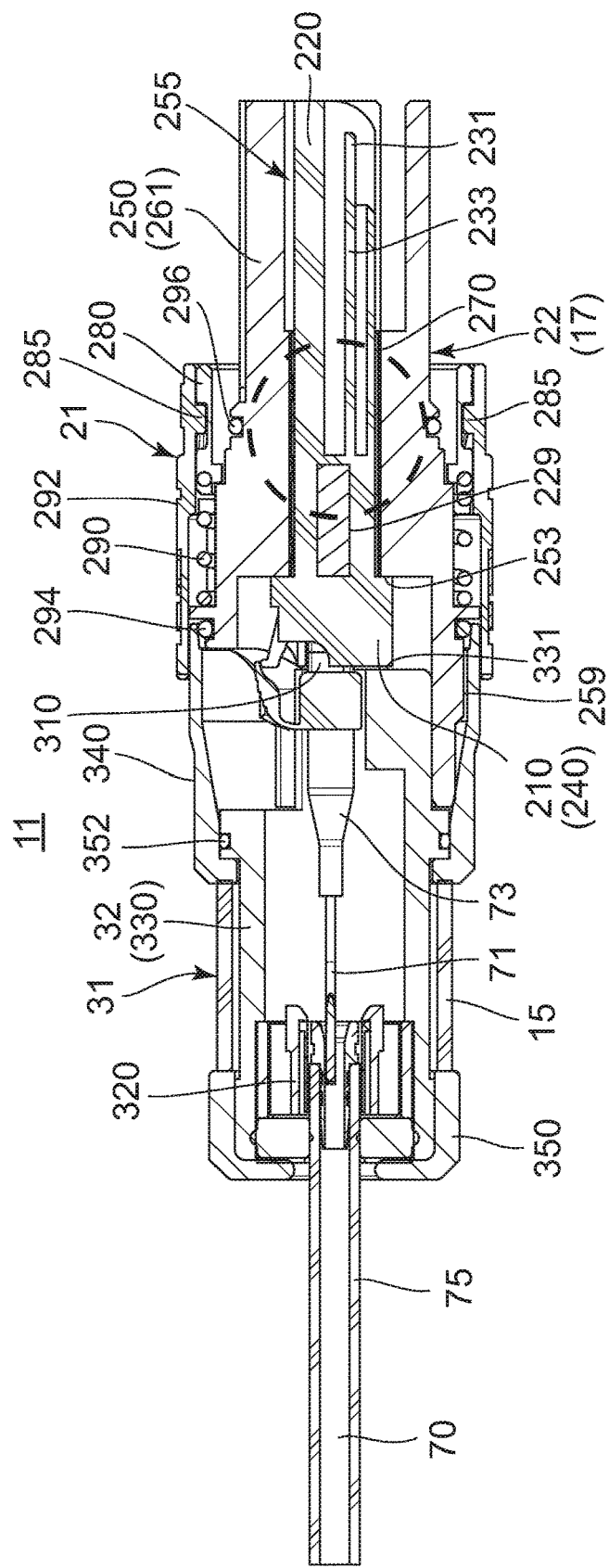
FIG. 9 is a cross-sectional view showing the plug connector of FIG. 8, taken along line A-A.

As shown in FIG. 9, the optical module 210 has a main portion 220 and a protruding portion 240. The main portion 220 has an approximately rectangular parallelepiped shape and extends in the front-rear direction. The protruding portion 240 is located rearward of the main portion 220. The protruding portion 240 protrudes outwardly with respect to the main portion 220 when seen along the front-rear direction. In other words, the protruding portion 240 protrudes in directions perpendicular to the front-rear direction. In the present embodiment, the optical module 210 is a small form-factor pluggable (SFP) module.

As shown in FIG. 9, the optical module 210 is also provided with a photoelectric conversion portion 229 and a first electric connector 231. The optical module 210 is connected to the optical connector 310 to transmit optical signals to the optical connector 310 and to receive other optical signals from the optical connector 310. The first electric connector 231 inputs and outputs electric signals into and from the photoelectric conversion portion 229. The photoelectric conversion portion 229 converts the optical signals and the electric signals mutually between the optical connector 310 and the first electric connector 231. In the present embodiment, the photoelectric conversion portion 229 and the first electric connector 231 are provided to the main portion 220. The first electric connector 231 is an edge connector which is provided with a plurality of contact pads (not shown) formed at an edge of a circuit board 233 provided to the main portion 220. As just described, the plug connector 11 is provided with the photoelectric conversion portion 229 and the first electric connector 231.

Figure 8:
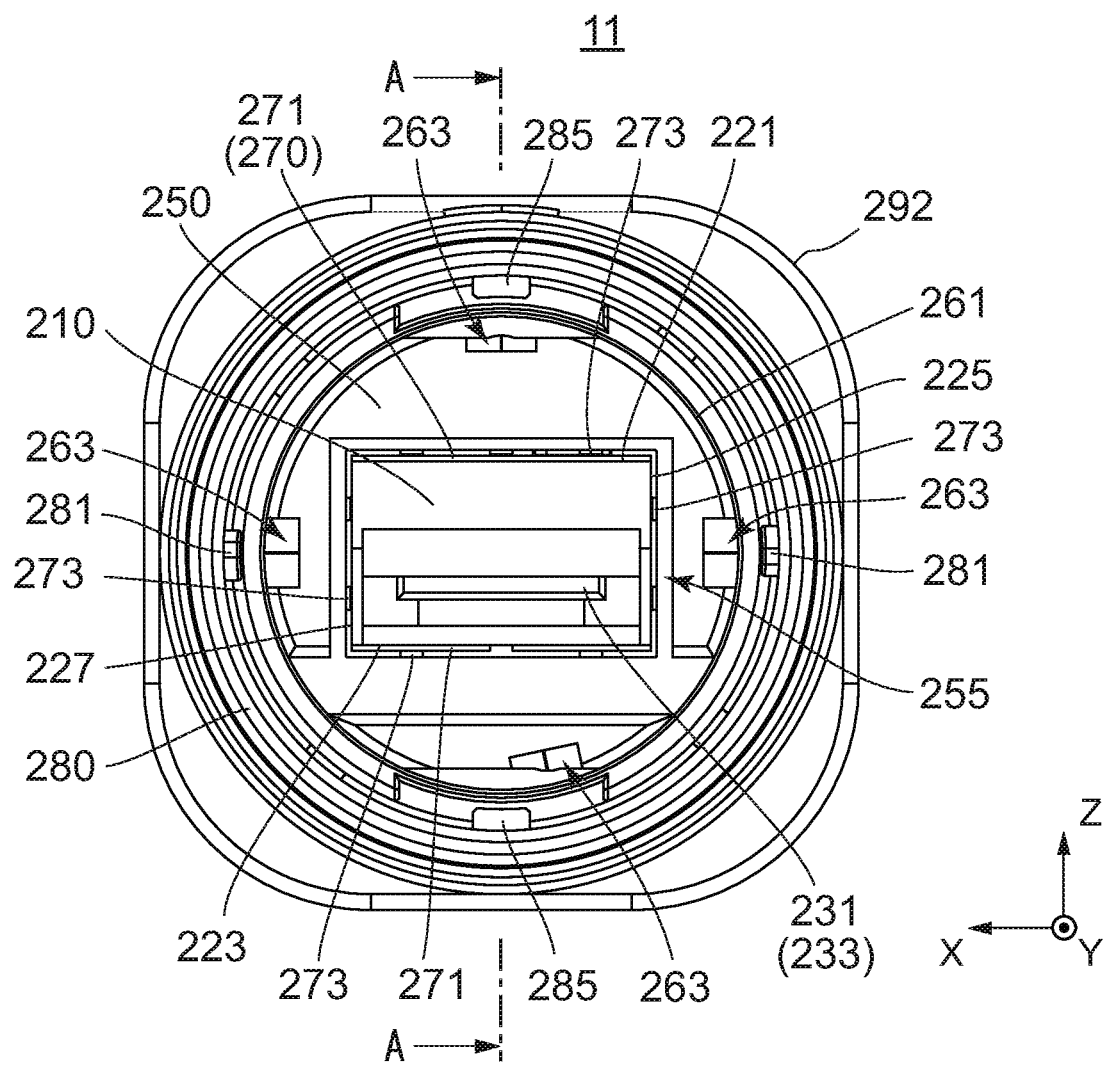
FIG. 8 is a front view showing the plug connector of FIG. 7.
Figure 10:
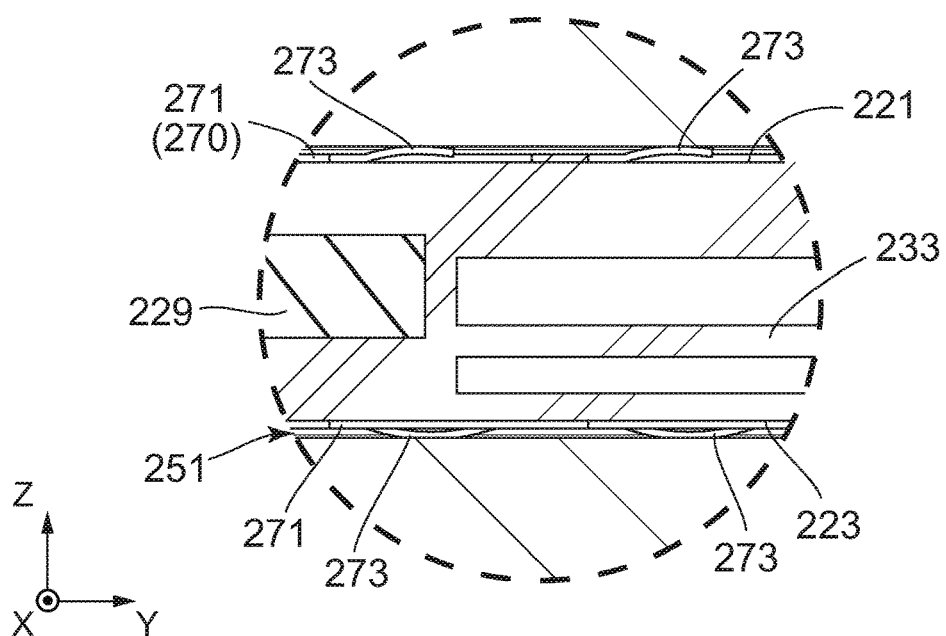
FIG. 10 is a partial, enlarged view showing a part (in a broken-line circle) of the plug connector of FIG. 9.
Figure 11:
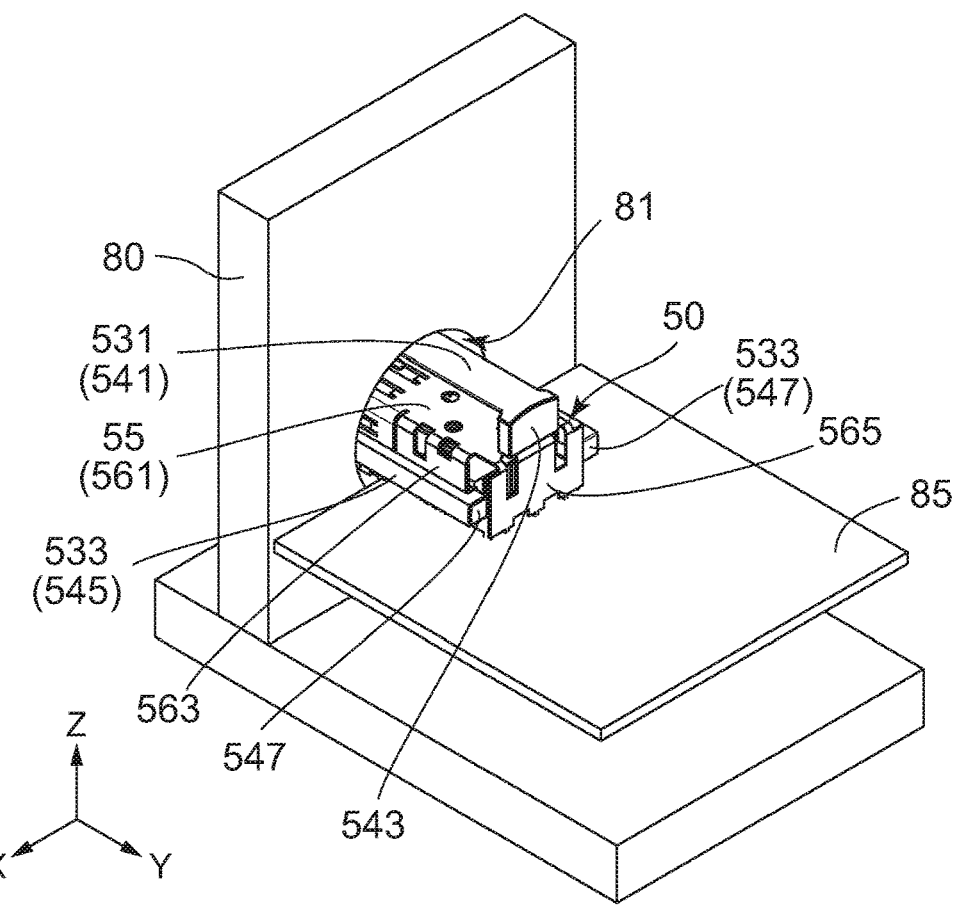
FIG. 11 a perspective view showing the receptacle connector included in the connector device of FIG. 1.
Figure 12:
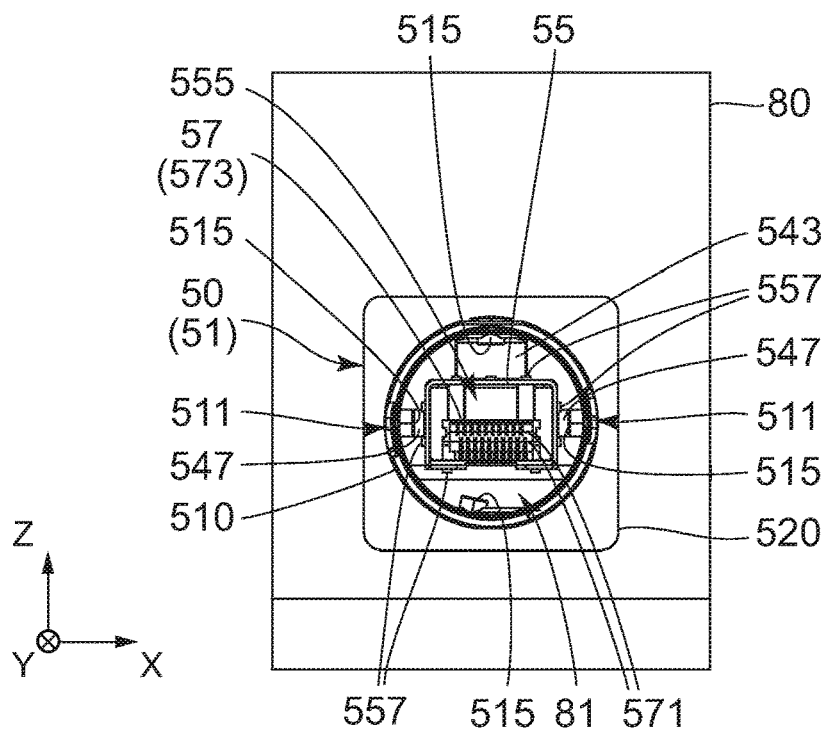
FIG. 12 is a rear view showing the receptacle connector of FIG. 11.

As shown in FIGS. 8 to 10, the optical module 210 is held by the front holder 250 via the support member 270. The front holder 250 is formed with a receiving portion 251 which receives the support member 270 and a part of the optical module 210. As described later, an edge portion 253 of the front holder 250 defining the receiving portion 251 functions as a first regulating portion.

Figure 7:
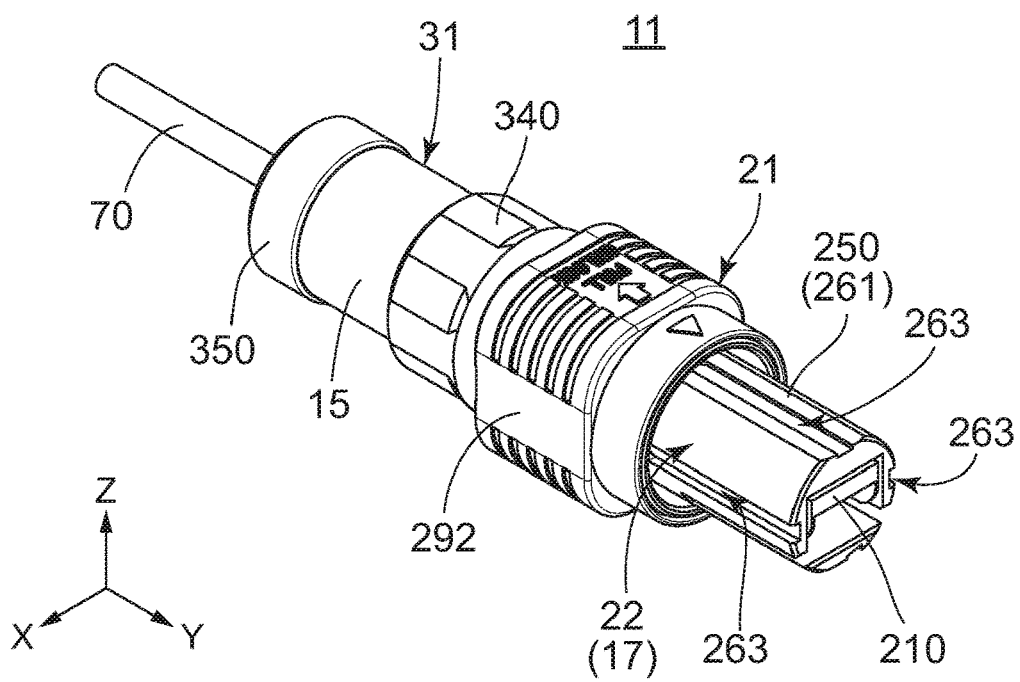
FIG. 7 is another perspective view showing the plug connector of FIG. 3. The stopper is attached to the plug connector main unit.

As shown in FIGS. 7 and 8, the front holder 250 has an insertion portion 261 which is inserted into the receptacle connector 50. The insertion portion 261 is formed with a plurality of guide grooves 263 each of which is recessed toward a central axis extending along the front-rear direction and extends along the front-rear direction. In the present embodiment, the guide grooves 263 are four in number. The guide grooves 263 are arranged to be asymmetrical with respect to the central axis extending along the front-rear direction.

As understood from FIG. 9, the optical module 210 is surrounded by the front holder 250 and the operation portion 292 in a plane perpendicular to the front-rear direction. In other words, the first shell 17 surrounds an entire circumference of the optical module 210 in the plane perpendicular to the front-rear direction. Between the optical module 210 and the first shell 17 or the front holder 250, a cage accommodation portion 255 is formed to extend in the front-rear direction.

As understood from FIGS. 8 to 10, the support member 270 is formed to have a rectangular tube shape and has four plate-like portions 271. Each of the plate-like portions 271 is formed with a plurality of plate springs 273 each of which protrudes in a direction perpendicular to a surface direction of each of the plate-like portions 271. As just described, the plug connector 11 is provided with the support member 270 having the plurality of the plate springs 273. In the present embodiment, the support member 270 is formed by punching out and bending a metal sheet. At this time, the plate springs 273 are formed by bending.

As shown in FIGS. 8 to 10, the upper and the lower plate-like portions 271 among the four plate-like portions 271 cover an upper surface 221 and a lower surface 223 of the main portion 220 of the optical module 210 in part, respectively. Moreover, each of the upper and the lower plate-like portions 271 is sandwiched between the optical module 210 and an inner surface of the front holder 250 in an up-down direction. By functions of the plate springs 273, the optical module 210 is supported to be in a floating state with respect to the front holder 250 in the up-down direction. The remaining two of the four plate-like portions 271 cover side surfaces 225 and 227 of the optical module 210 in part, respectively. Here, the side surfaces 225 and 227 of the optical module 210 are formed with recesses corresponding to the remaining plate-like portions 271, and the remaining plate-like portions 271 are accommodated in the recesses. Accordingly, the remaining plate-like portions 271 covering the side surfaces 225 and 227 are invisible in FIG. 8. Nevertheless, the support member 270 supports the optical module 210 to be in a floating state with respect to the front holder 250 in a lateral direction. Thus, the optical module 210 is supported to be in the floating state with respect to the front holder 250 in a plane perpendicular to the front-rear direction. Surrounding the optical module 210 by the support member 270 made of metal allows noise radiation from the optical module 210 to be suppressed and allows heat radiation from the optical module 210 to be facilitated. It should be noted that the up-down direction is a Z-direction in the present embodiment. A positive Z-direction is directed upward while a negative Z-direction is directed downward. Moreover, in the present embodiment, the lateral direction is an X-direction.

As understood from FIGS. 8 and 9, the lock ring 280 is formed to have an approximately cylindrical shape. Moreover, as shown in FIG. 8, the lock ring 280 is provided with a pair of lock portions (first lock portions) 281 which protrude inward in a radial direction. In other words, the plug connector 11 is provided with the first lock portions 281. As understood from FIG. 27, each of the lock portions 281 has a lock surface 283 perpendicular to the front-rear direction. In the front-rear direction, the lock portion 281 and the first electric connector 231 are apart from each other by a first distance D1.

As understood from FIGS. 8 and 9, the lock ring 280 is attached to the front holder 250 so as to surround an entire circumference of a part of the front holder 250. The lock ring 280 is provided near the middle part of the front holder 250 in the front-rear direction. The lock ring 280 is rotatable around an axis extending along the front-rear direction within a predetermined angle range in relation to the front holder 250. The lock ring 280 is maintained at a predetermined angular position by the lock spring 290.

As understood from FIGS. 7 to 9, the operation portion 292 is attached to the front holder 250 so as to cover the lock ring 280 and the lock spring 290 in a plane perpendicular to the front-rear direction. In a state that the operation portion 292 is attached to the front holder 250, the operation portion 292 is movable between a first position and a second position along the front-rear direction. The operation portion 292 and the lock ring 280 are coupled to each other by a cam mechanism 285. In an initial state, the operation portion 292 is positioned at the first position which is located more forward than the second position. Upon moving the operation portion 292 rearward from the first position toward the second position, the lock ring 280 is turned against a force of the lock spring 290 by an action of the cam mechanism 285. When the operation portion 292 is released from an external force, the lock ring 280 is returned to the predetermined angular position by the force of the lock spring 290. According to this, the operation portion 292 is returned to the first position by the action of the cam mechanism 285. As described later, when the operation portion 292 is positioned at the first position, the lock portions 281 of the lock ring 280 can lock locked portions (second lock portions) 511 (see FIGS. 16, 17 and 27). When the operation portion 292 is positioned at the second position, the lock portions 281 of the lock ring 280 can release the lock of the locked portions 511 provided to the receptacle connector 50.

As shown in FIG. 9, the optical connector 310 is attached to a distal end of the optical fiber cable 70 used to transmit an optical signal. In detail, the optical connector 310 is attached to a distal end of an optical fiber 71 included in the optical fiber cable 70 vie a ferrule 73. The optical connector 310 is formed to be attachable to and detachable from the optical module 210.

As shown in FIG. 9, the cable-holding portion 320 holds the optical fiber cable 70 used to transmit the optical signal. In detail, the cable-holding portion 320 holds the optical fiber cable 70 at an end part of an outer sheath 75 of the optical fiber cable 70. The cable-holding portion 320 holds the optical fiber cable 70 not to be rotatable about an axis extending along the front-rear direction. The optical fiber 71 extends more forward than the end part of the outer sheath 75.

Figure 5:
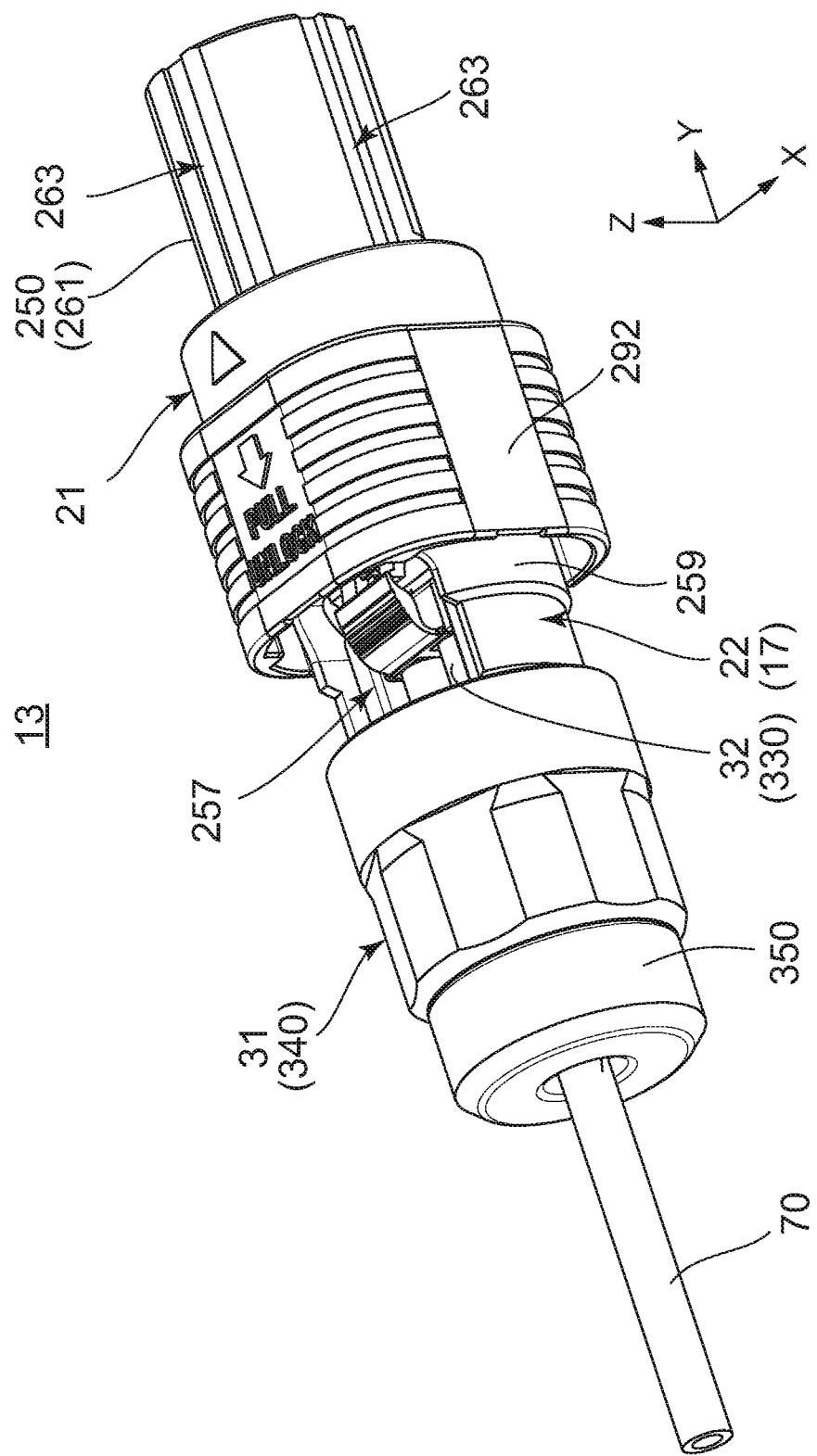
FIG. 5 is another perspective view showing the plug connector main unit of FIG. 4. The front portion and the rear portion are combined with each other. A coupling nut does not yet fasten the front portion and the rear portion to each other.

As understood from FIGS. 4 and 5, the front portion 21 and the rear portion 31 are combined with each other. In other words, the first member 22 and the second member 32 are combined with each other. In the state that the front portion 21 and the rear portion 31 are combined with each other, the optical connector 310 and the optical module 210 are mated with each other. In this state, the first shell 17 holds the optical connector 310 and the optical module 210 and covers the optical connector 310 and the optical module 210 at least in part. In a state before the front portion 21 and the rear portion 31 are fastened to each other using the coupling nut 340, the plug connector main unit 13 is provided with an opening portion 257. In other words, in the state before the first member 22 and the second member 32 are fastened to each other, the first shell 17 has the opening portion 257 opening in a direction perpendicular to the front-rear direction. Then, through the opening portion 257, the optical module 210 and the optical connector 310 are visible in part. In particular, through the opening portion 257, the protruding portion 240 of the optical module 210 is visible. Hence, a visual confirmation can be carried out for a mating state between the optical module 210 and the optical connector 310. Moreover, it can be visually confirmed whether a front end (second regulating portion) 331 of the rear holder 330 is brought into abutment into the optical module 210.

Referring again to FIG. 9, the protruding portion 240 is sandwiched between the edge portion 253 of the front holder 250 and the front end 331 of the rear holder 330 at least in part. In other words, the first shell 17 has the first regulating portion 253 provided to the first member 22 and the second regulating portion 331 provided to the second member 32, and the first regulating portion 253 and the second regulating portion 331 sandwich the protruding portion 240 in the front-rear direction. With this, movement of the optical module 210 in the front-rear direction is regulated at the inside of the first shell 17. Here, there is a possibility that a length of the protruding portion 240 in the front-rear direction is different with each manufacturer who manufactures the optical module 210. Therefore, in order to regulate certainly the movement of the optical module 210 in the front-rear direction, the front end 331 of the rear holder 330 may be provided with a foam spring. Moreover, on a surface of the foam spring, a lubricating film may be put on. Thus, the protruding portion 240 of the optical module 210 can be certainly sandwiched by the edge portion 253 of the front holder 250 and the front end 331 of the rear holder 330. In other words, the protruding portion 240 is pushed forward by the second regulating portion 331 and the foam spring and pressed against the first regulating portion 253. Thus, the state that the protruding portion 240 is in contact with the first regulating portion 253 can be maintained certainly. Therefore, provided that a size of the main portion 220 of the optical module 210 is within predetermined tolerance, connection between the first electric connector 231 and a second electric connector 57 (see FIG. 26) can be carried out certainly without being affected by a size of the protruding portion 240.

Figure 6:
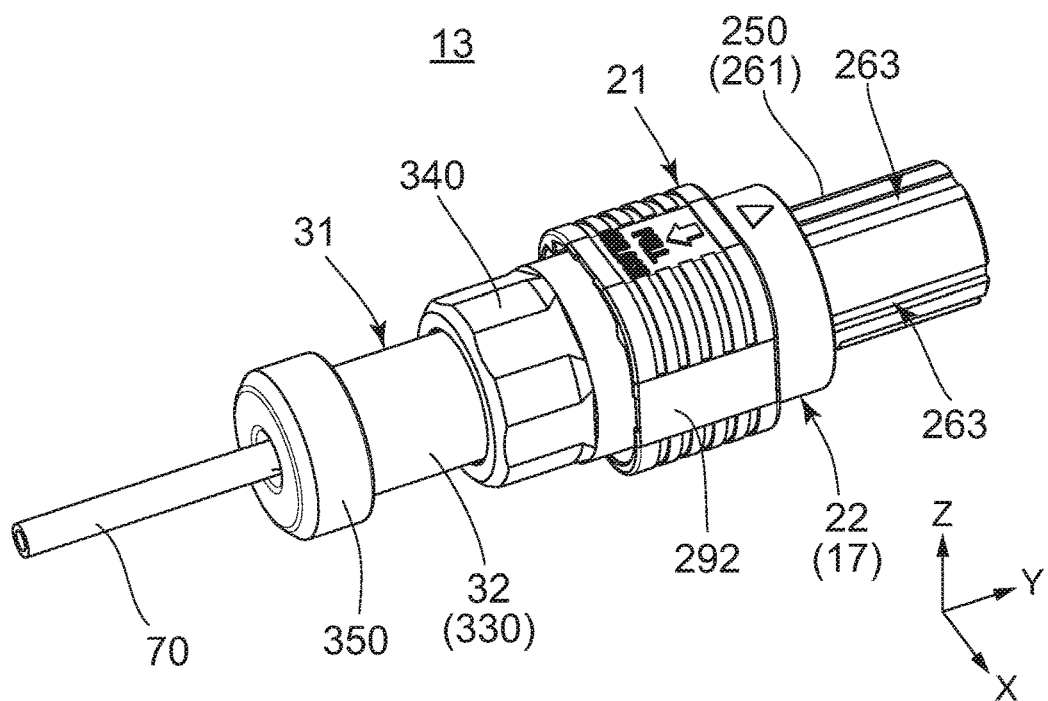
FIG. 6 is still another perspective view showing the plug connector main unit of FIG. 4. The front portion and the rear portion are combined with each other and fastened to each other by the coupling nut.

As shown in FIG. 6, by screwing the coupling nut 340 of the rear portion 31 with a male screw portion 259 of the front portion 21, the front portion 21 and the rear portion 31 are fastened to each other. The male screw portion 259, as shown in FIGS. 4 and 5, is formed on a circumference of the rear portion 31 of the front holder 250. The opening portion 257 is formed in the front holder 250 so that the male screw portion 259 is cut at the middle thereof.

As shown in FIG. 9, the front portion 21 is further provided with a first water stop portion 294, and the rear portion 31 is further provided with a second water stop portion 352. In other words, the first shell 17 is provided with the first water stop portion 294 and the second water stop portion 352. The first water stop portion 294 is attached to the first member 22 while the second water stop portion 352 is attached to the second member 32. The first water stop portion 294 covers an entire circumference of the front holder 250 included in the first member 22 in a plane perpendicular to the front-rear direction. The second water stop portion 352 covers an entire circumference of the rear holder 330, which is the second member 32, in a plane perpendicular to the front-rear direction. Upon fastening the coupling nut 340 tight to the male screw portion 259, the first water stop portion 294 is sandwiched between the coupling nut 340 and the front holder 250 to prevent water from passing through therebetween. Moreover, the second water stop portion 352 is sandwiched between the coupling nut 340 and the rear holder 330 to prevent water from passing through therebetween. The opening portion 257 is located between the first water stop portion 294 and the second water stop portion 352 in the front-rear direction. Accordingly, fastening the coupling nut 340 tight to the male screw portion 259 shuts the opening portion 257 from the outside. The front portion 21 further has a third water stop portion 296.

As shown in FIGS. 1 and 11 to 15, the receptacle connector 50 is provided with a receptacle (second shell) 51, a cage 55 and the second electric connector 57.

Figure 16:
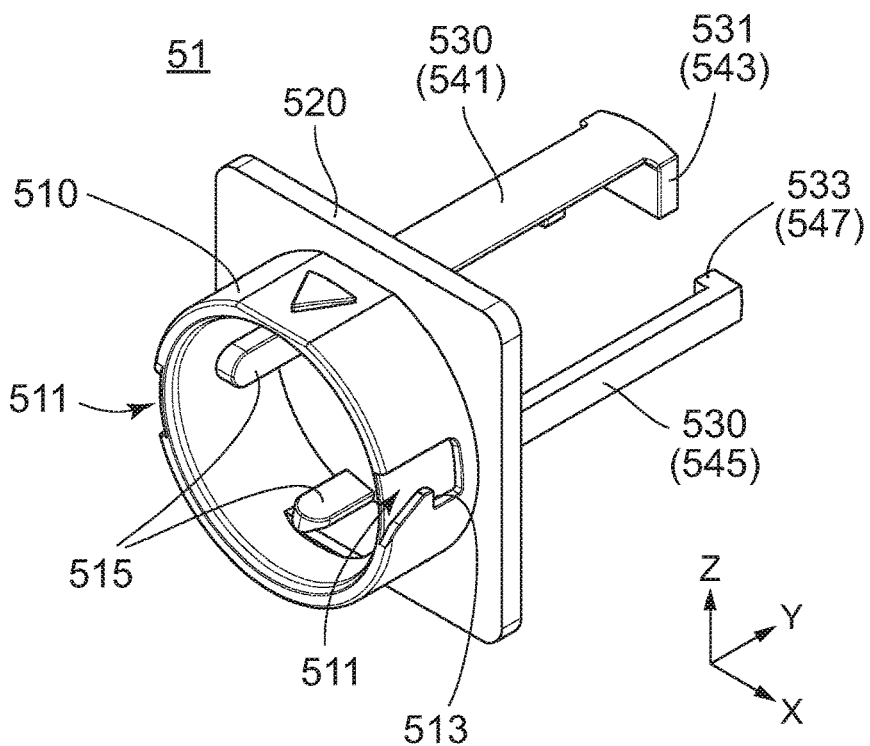
FIG. 16 is a perspective view showing the receptacle included in the receptacle connector of FIG. 11.
Figure 17:
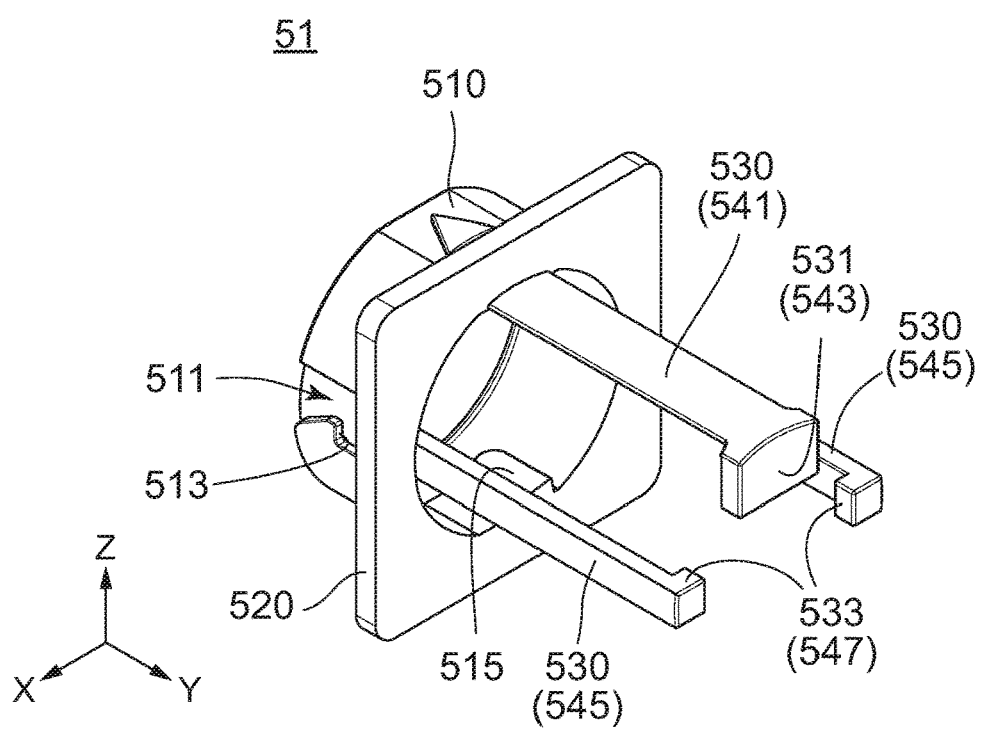
FIG. 17 is another perspective view showing the receptacle of FIG. 16.
Figure 18:
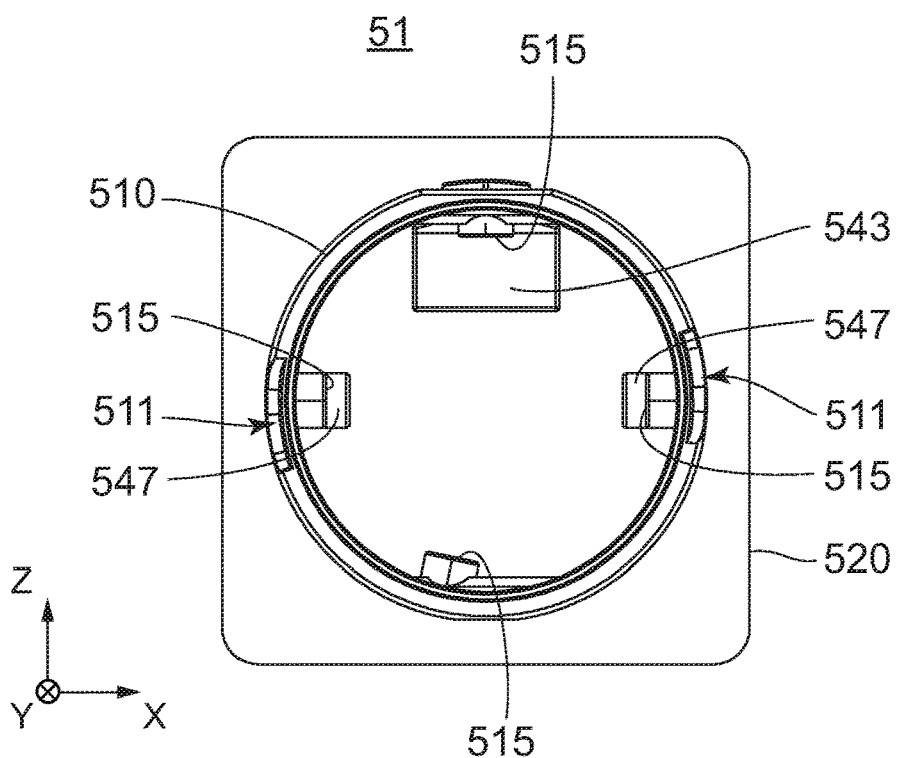
FIG. 18 is a rear view showing the receptacle of FIG. 16.

As shown in FIGS. 16 to 18, the receptacle 51 has a ring shape portion 510, a flange portion 520 and three arm portions 530. The receptacle 51 is made of metal and has conductivity.

As shown in FIGS. 16 to 18, on an outer peripheral surface of the ring shape portion 510, the locked portions (second lock portions) 511 are formed. In other words, the receptacle connector 50 is provided with the second lock portions 511. The locked portions 511 are recess portions dented inward in the lateral direction. The locked portions 511 are engaged with the lock portions 281 when the plug connector 11 and the receptacle connector 50 are mated with each other. In detail, a wall surface defining the locked portion 511 has a locked surface 513 perpendicular to the front-rear direction. If the plug connector 11 is tried to be moved rearward in relation to the receptacle connector 50 in a state that the lock portions 281 lock the locked portions 511, the lock surfaces 283 (see FIG. 27) comes to be brought into abutment with the locked surfaces 513. Accordingly, it is prevented to remove the plug connector 11 from the receptacle connector 50.

As shown in FIGS. 16 to 18, an inner peripheral surface formed in the ring shape portion 510 and the flange portion 520 is formed with four guide protrusions 515. The guide protrusions 515 protrude toward a center of the ring shape portion 510 and extend in the front-rear direction. The guide protrusions 515 are arranged at rotational asymmetric positions with respect to a central axis of the ring shape portion 510 to prevent miss mating.

As shown in FIGS. 16 to 18, the flange portion 520 is located forward of the ring shape portion 510 and protrudes more outward than the outer peripheral surface of the ring shape portion 510 in both of the up-down direction and the lateral direction. As shown in FIG. 18 especially, the flange portion 520 has an approximately square shape when seen along the front-rear direction.

Referring to FIGS. 16 to 18, the three arm portions 530 have an upper arm portion 531 and a pair of side arm portions 533. The arm portions 530 extend along the front-rear direction. In detail, the upper arm portion 531 has a support portion 541 extending forward from the flange portion 520 and an end portion 543 extending in the lateral direction and extending downward from a distal end of the support portion 541. The side arm portions 533 have support portions 545 continued from two of the guide protrusions 515 and extending forward and end portions 547 extending inward in the lateral direction from distal ends of the support portions 545.

Figure 19:
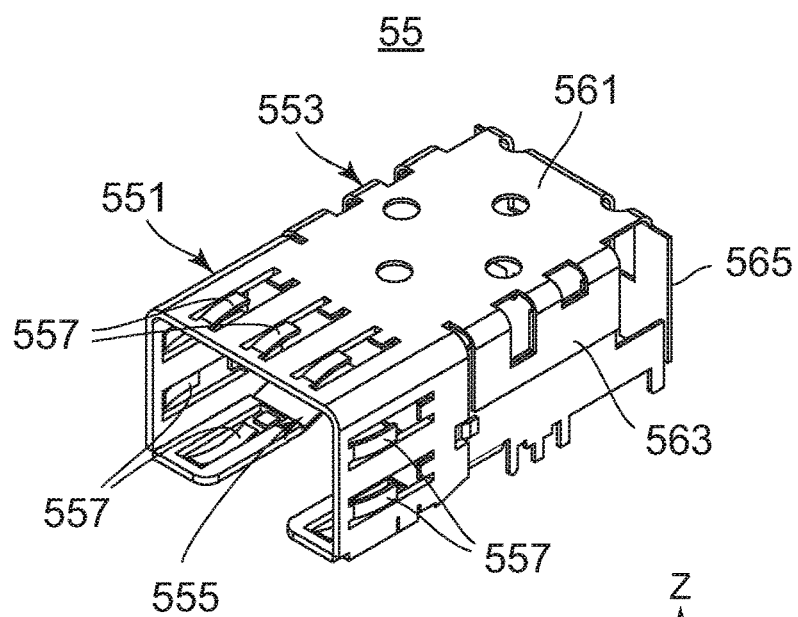
FIG. 19 is a perspective view showing the cage included in the receptacle connector of FIG. 11.
Figure 20:
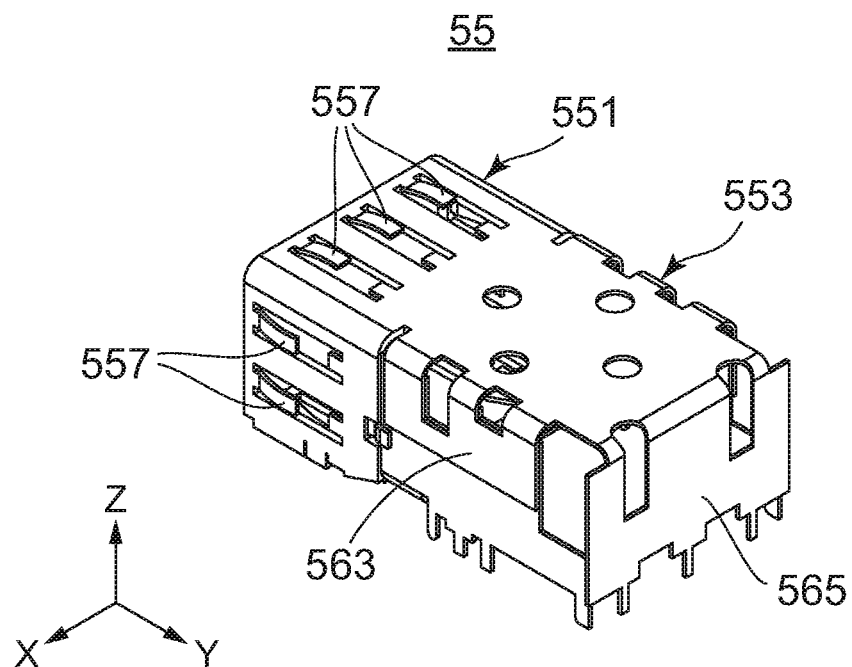
FIG. 20 is another perspective view showing the cage of FIG. 19.

As shown in FIGS. 19 and 20, the cage 55 has a rear portion 551 and a front portion 553. The cage 55 has an inner space 555 extending over the rear portion 551 and the front portion 553. The rear portion 551 has a plurality of plate springs 557 protruding outward in the up-down direction or the lateral direction. The rear portion 551 opens downward in part. The front portion 553 opens downward. The front portion 553 has an upper plate 561, side plates 563 and a front plate 565. The cage 55 is formed by punching out a metal sheet and bending it and has conductivity.

Figure 21:
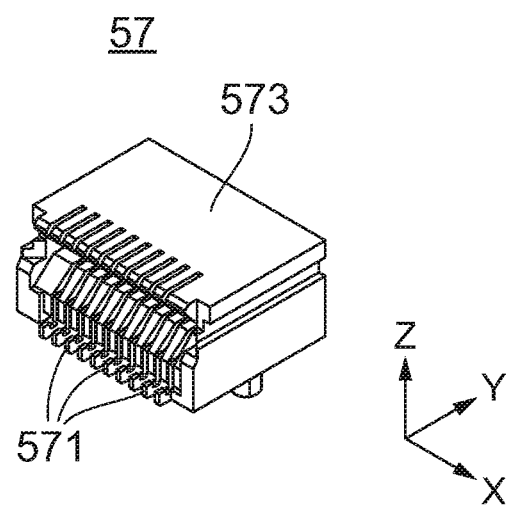
FIG. 21 is a perspective view showing the second electric connector included in the receptacle connector of FIG. 11.
Figure 22:
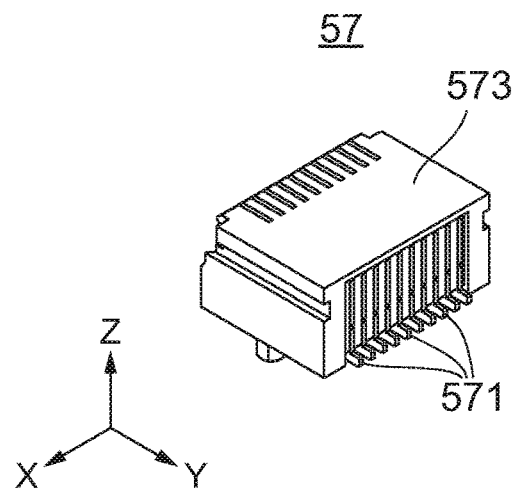
FIG. 22 is another perspective view showing the second electric connector of FIG. 21.

As understood from FIGS. 21 and 22, the second electric connector 57 is an edge connector. The second electric connector 57 is connected to the first electric connector 231 when the plug connector 11 and the receptacle connector 50 are mated with each other. In the present embodiment, the second electric connector 57 has a plurality of contacts 571. The contacts 571 are held by a contact holder 573 having electric non-conductance. As understood from FIGS. 24 and 25, the contacts 571 have contact points 572, and the contact points 572 are vertically arranged in two rows.

Figure 23:
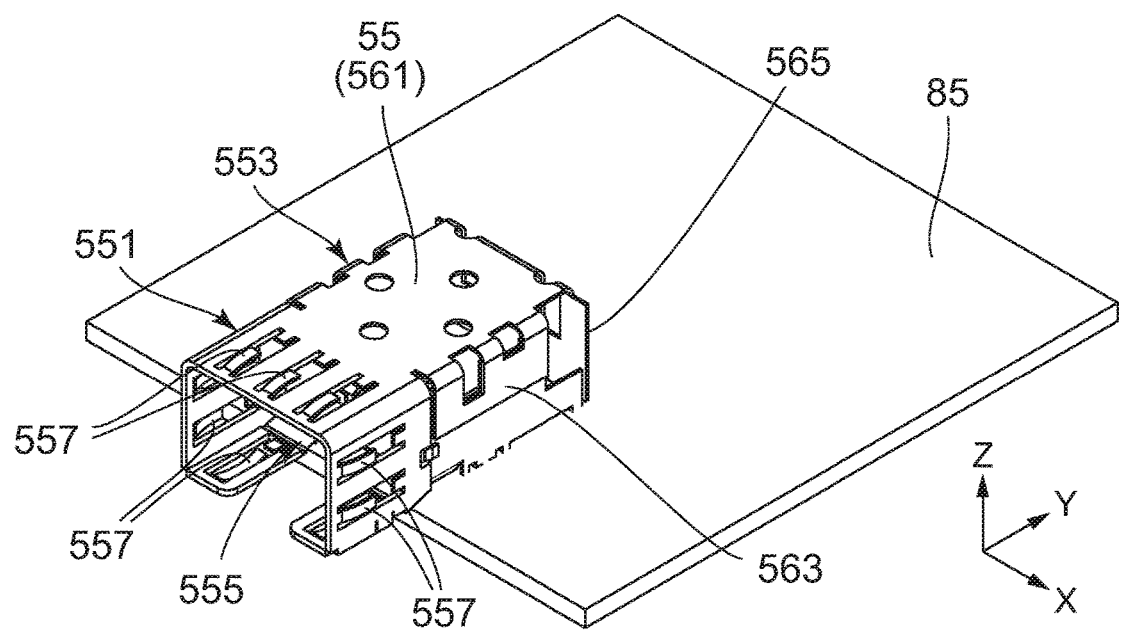
FIG. 23 is a perspective view showing the cage and the second electric connector included in the receptacle connector of FIG. 11. The cage and the second electric connector are mounted on the circuit board. The second electric connector is accommodated inside the cage.
Figure 24:
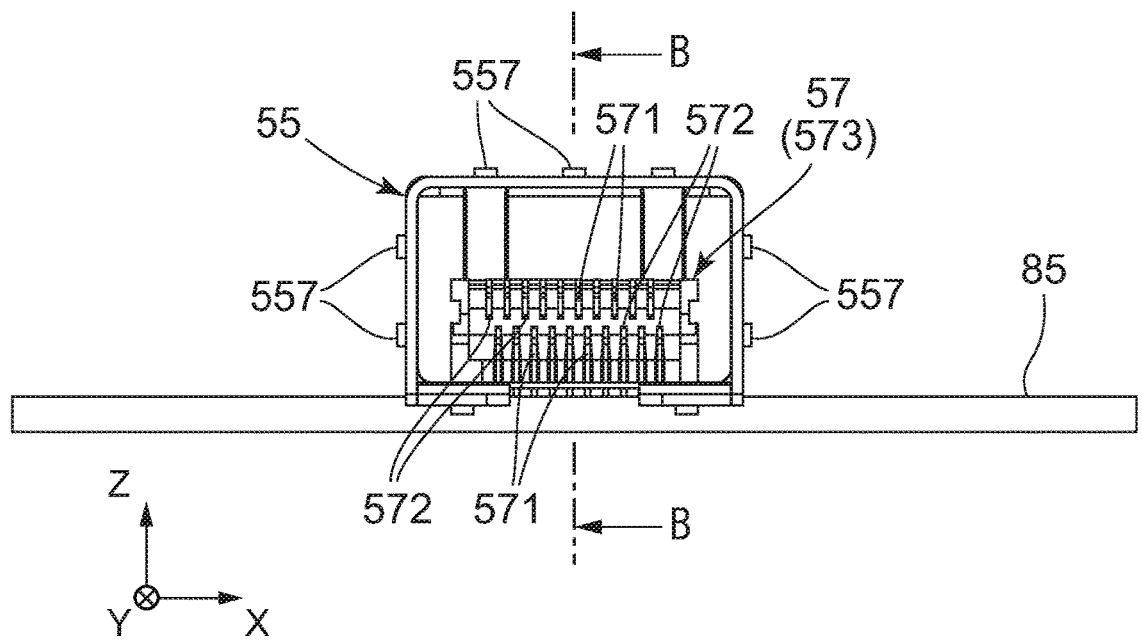
FIG. 24 is a rear view showing the cage and the second electric connector of FIG. 23.
Figure 25:
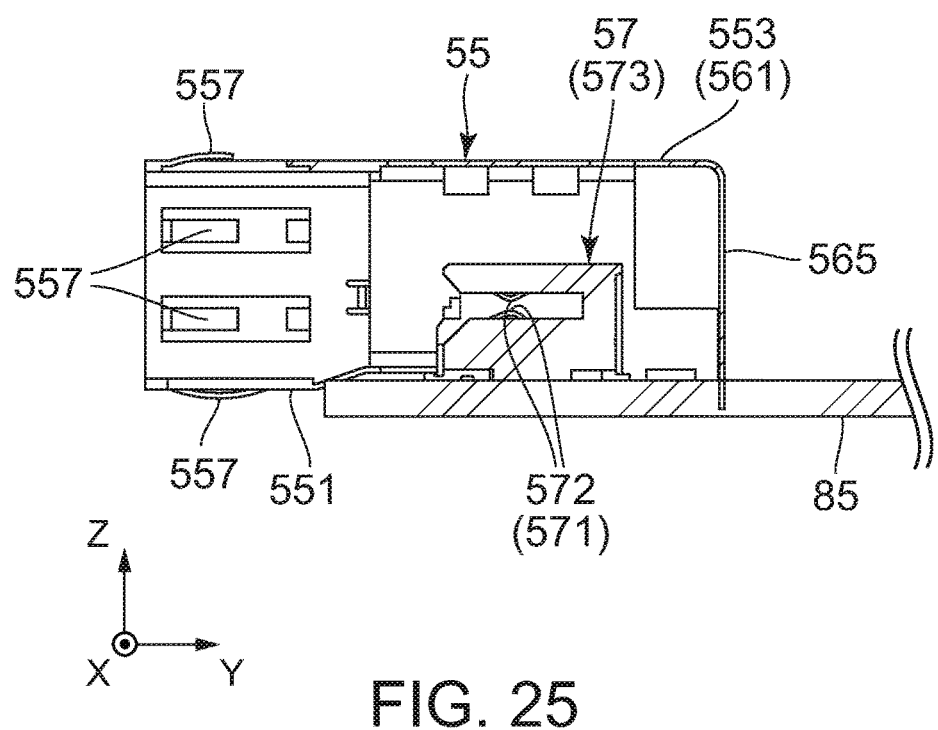
FIG. 25 is a cross-sectional view showing the cage and the second electric connector of FIG. 24, taken along line B-B.

As shown in FIGS. 23 to 25, the cage 55 and the second electric connector 57 are mounted on or fixed to the circuit board 85 when used. Moreover, the second electric connector 57 is accommodated in the inner space 555 of the cage 55.

As understood from FIGS. 11 to 15, the circuit board 85 is arranged inside the case 80 when used. The second electric connector 57 mounted on the circuit board 85 is also arranged inside the case 80 when used. The receptacle 51 is attached to the case 80 when used. In such a case, the ring shape portion 510 and the flange portion 520 are positioned outside the case 80, and the arm portions 530 extend inside the case 80 through an aperture 81. Here, the circuit board 85 is not directly fixed to the case 80 but indirectly fixed to the case 80 via another member (not shown). Therefore, there is a variation in a positional relationship between the aperture 81 formed in the case 80 and the circuit board 85.

Figure 27:
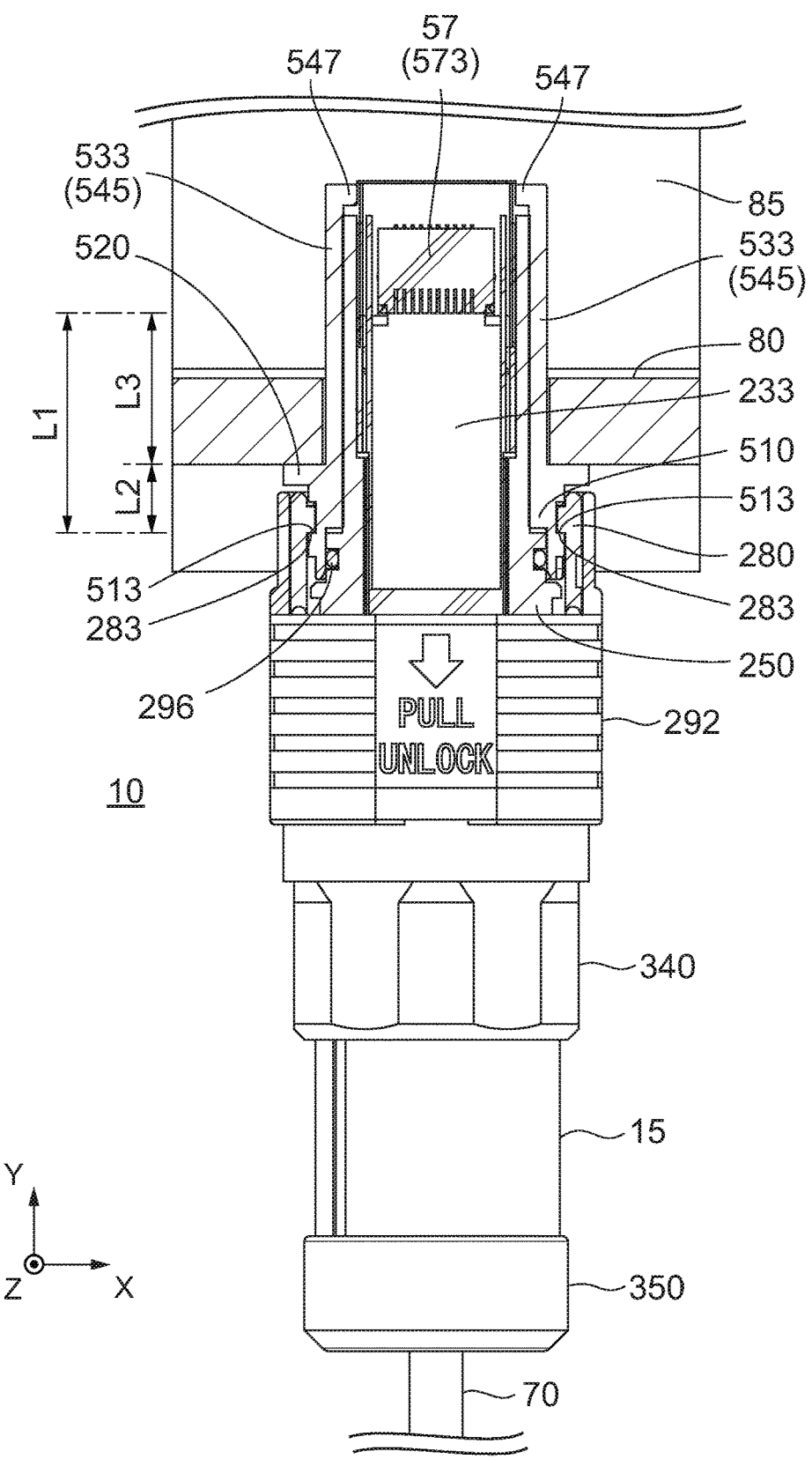
FIG. 27 is a plan view showing the connector device of FIG. 26 and partly includes a cross-sectional view, taken along line D-D.

Accordingly, alignment of the receptacle 51 is necessary when the receptacle 51 is attached to the case 80. It should be noted that, in the present embodiment, an interval between the case 80 and the circuit board 85 in the front-rear direction is appropriately adjusted using a positioning jig (not shown). In detail, each of lengths L1, L2 and L3 shown in FIG. 27 is adjusted to be within its predetermined tolerance in the front-rear direction. Here, the length L1 represents an interval between the locked surface 513 and a rear end of the second electric connector 57 in the front-rear direction. The length L2 represents an interval between the locked surface 513 and a front surface of the flange portion 520 in the front-rear direction. The length L3 represents an interval between the front surface of the flange portion 520 and the rear end of the second electric connector 57 in the front-rear direction.

As understood from FIGS. 11 to 15, the arm portions 530 of the receptacle 51 have shapes and arrangement to correspond to a size of the cage 55. Accordingly, positioning of the receptacle 51 in relation to the case 80 can be carried out in a surface direction perpendicular to the front-rear direction by inserting the arm portions 530 of the receptacle 51 into the aperture 81 of the case 80 to be brought into contact with the cage 55. Moreover, in a rotative direction with respect to an axis extending along the front-rear direction, an angle of the receptacle 51 in relation to the case 80 can be also decided. In other words, in a state that the flange portion 520 of the receptacle 51 is in contact with an outer surface of the case 80, the end portion 543 of the upper arm portion 531 is arranged to be brought into contact with an edge portion of the upper plate 561 of the cage 55, and end surfaces of the end portions 547 of the side arm portions 533 are arranged to be put on the same planes as surfaces of the side plates 563. At this time, provided that positional relationship between the case 80 and the circuit board 85 is appropriate, front surfaces of the end portions 543 and 547 are positioned on the same plane as a rear surface of the front plate 565 of the cage 55. Thus, the positioning of the receptacle 51 is carried out in relation to the aperture 81 of the case 80. After that, the receptacle 51 is fixed to the case 80 by using bolts (not shown). The case 80 is formed with screw holes (not shown) corresponding to the bolts. As a result, the receptacle 51 is attached to the cage 55. The flange portion 520 is formed with unloaded holes (not shown) for insertion of the bolts.

Figure 13:
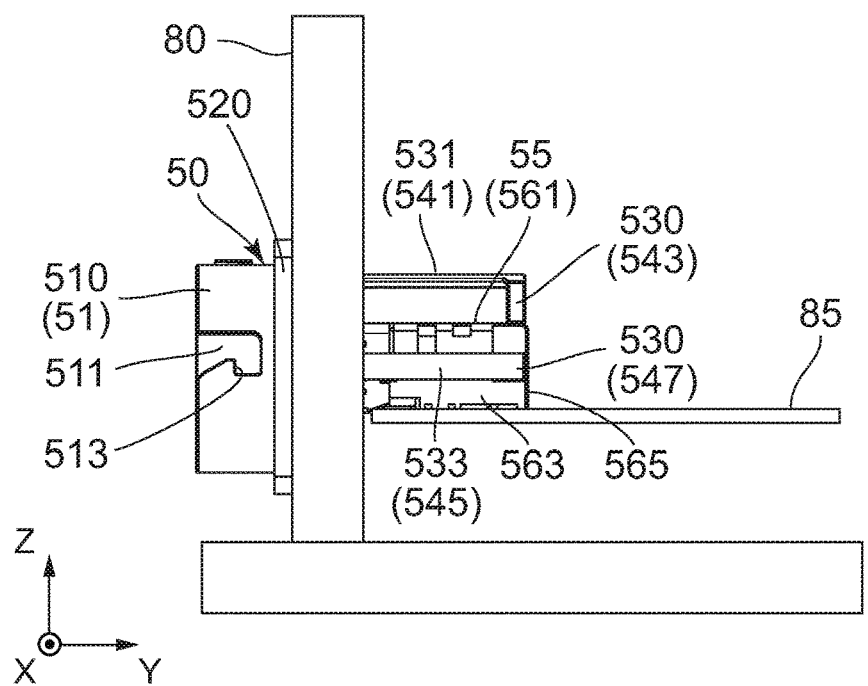
FIG. 13 is a side view showing the receptacle connector of FIG. 11.
Figure 14:
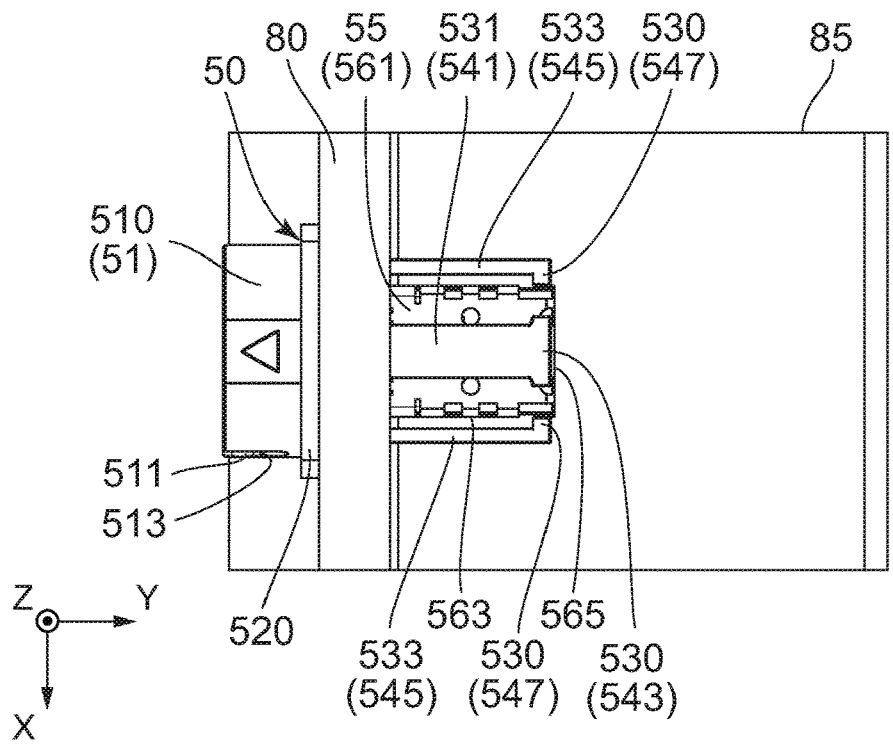
FIG. 14 is a plan view showing the receptacle connector of FIG. 11.
Figure 15:
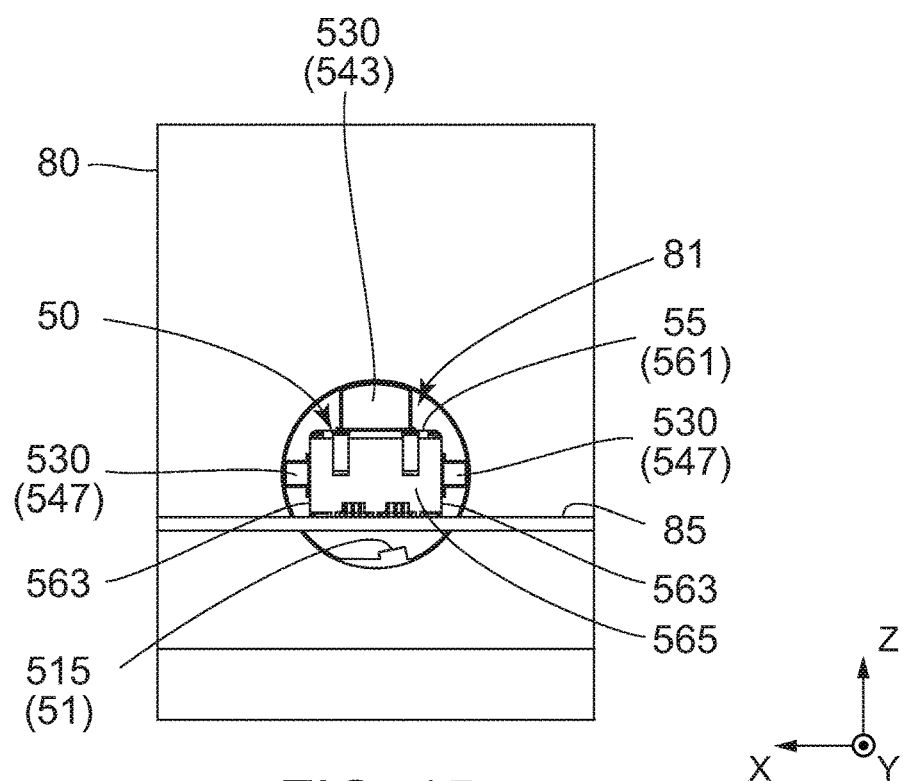
FIG. 15 is a front view showing the receptacle connector of FIG. 11.

As shown in FIG. 13, the locked portions 511 are located outside the case 80. In other words, the second lock portions 511 are provided on the second shell (receptacle 51) to be located outside the case 80. Moreover, the receptacle 51 is fixed to the case 80 and attached to the cage 55 without being fixed to the cage 55 so that a distance between the locked portions 511 and the second electric connector 57 is equal to a second distance D2 in the front-rear direction. In detail, the second distance D2 represents a distance between the locked surfaces 513 of the locked portions 511 and the contact points 572 (see FIG. 25) of the contacts 571 of the second electric connector 57 in the front-rear direction. The arm portions 530 are attached at predetermined positions of the cage 55, thereby fixing the distance between the locked portions 511 and the second electric connector 57 to the second distance D2. Thus, in the front-rear direction, the locked portions 511 and the second electric connector 57 are apart from each other by the second distance D2.

Figure 26:
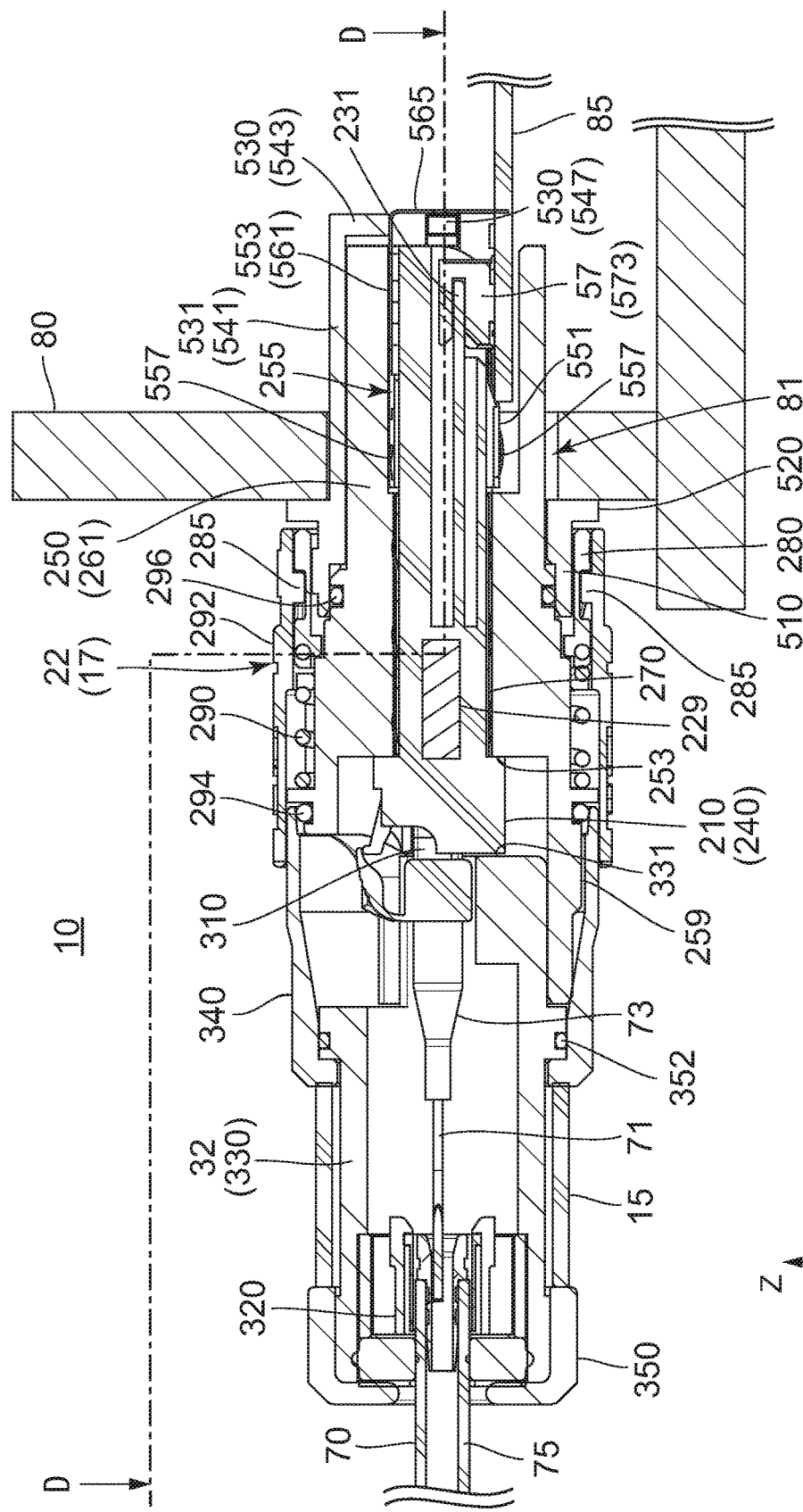
FIG. 26 is a cross-sectional view showing the connector device of FIG. 2, taken along line C-C.

As shown in FIG. 26, when the plug connector 11 and the receptacle connector 50 are mated with each other, the cage 55 is accommodated in the cage accommodation portion 255 in part. Moreover, the first electric connector 231 is connected to the second electric connector 57. Furthermore, the third water stop portion 296 is sandwiched between the front holder 250 and the receptacle 51 to prevent water from passing through therebetween.

The first electric connector 231 and the second electric connector 57 have an effective contact length D3 in the front-rear direction. The effective contact length D3 represents a distance for that the contacts 571 of the second electric connector 57 can be in contact with contact pads (not shown) of the first electric connector 231. In other words, the contact pads of the first electric connector 231 have a contactable range, as a range for being in contact with the contacts 571, having a length equal to the effective contact length D3 in the front-rear direction. As understood from FIGS. 26 and 27, in order to appropriately and electrically connect the first electric connector 231 to the second electric connector 57, a distance (first distance D1) from the lock portions (the lock surfaces 283) to a front end of the contactable range of the contact pads of the first electric connector 231 must be longer than a distance (the second distance D2) from the locked portions 511 (the locked surfaces 513) to the contact points 572 (see FIG. 25) of the second electric connector 57 (D1>D2). However, when a difference between the first distance D1 and the second distance D2 is more than the effective contact length D3 (D1−D2>D3), the lock portions 281 cannot lock the locked portions 511. Accordingly, the difference between the first distance D1 and the second distance D2 must be equal to the effective contact length D3 or less. In the present embodiment, the plug connector 11 and the receptacle connector 50 are formed to meet such requirements. Accordingly, if it is confirmed that the lock portions 281 can lock the locked portions 511, alignment and connection establishment between the plug connector 11 and the receptacle connector 50 are also confirmed. Thus, in the connector device 10 according to the present embodiment, alignment and connection establishment between the first electric connector 231 and the second electric connector 57 can be easily confirmed.

In the aforementioned embodiment, the description has been made about an example that the positioning of the receptacle 51 is carried out by using the arm portions 530 provided to the receptacle 51. However, the present invention is not limited thereto. In a case of positioning of a receptacle 51A (see FIGS. 30 to 32) which does not have the arm portions 530, it can be carried out by using a jig described below.

Figure 28:
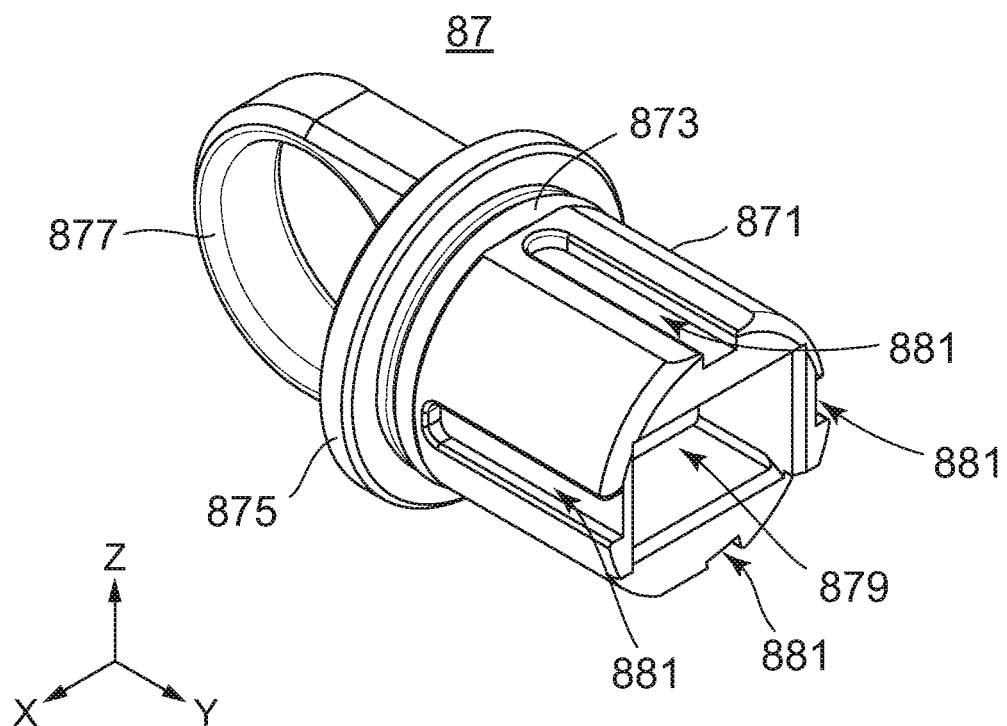
FIG. 28 is a perspective view showing a jig used to assemble the receptacle connector.
Figure 29:
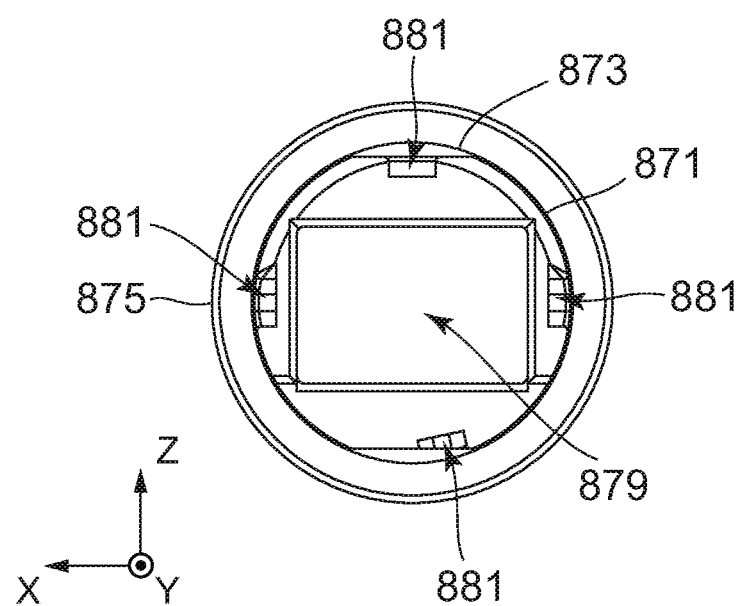
FIG. 29 is a front view showing the jig of FIG. 28.

Referring to FIGS. 28 and 29, the jig 87 used to carry out the positioning of the receptacle 51A (see FIGS. 30 to 32) has an insertion portion 871, an O-ring 873, a flange portion 875 and a tab 877. As shown in FIGS. 28 and 29, in an outer peripheral surface of the insertion portion 871, guide grooves 881 are formed to correspond to guide protrusions 515A (see FIG. 32) of the receptacle 51A. The O-ring 873 is fit into a groove formed in the insertion portion 871 in part. The O-ring 873 is located near a rear end of the insertion portion 871 or near the flange portion 875 and surrounds an entire circumference of the insertion portion 871 in a plane perpendicular to the front-rear direction. The insertion portion 871 is formed with a receiving portion 879 which receives the rear portion 551 of the cage 55.

Figure 30:
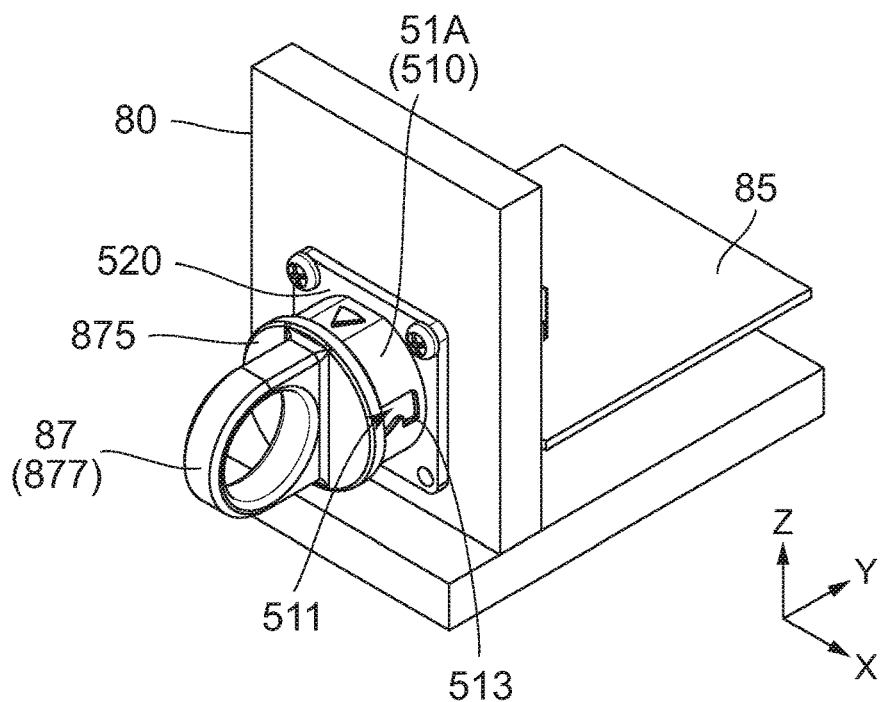
FIG. 30 is a perspective view showing a state that the receptacle connector is halfway assembled using the jig of FIG. 28. Positioning of the receptacle is finished, and two screws are attached to the receptacle.
Figure 31:
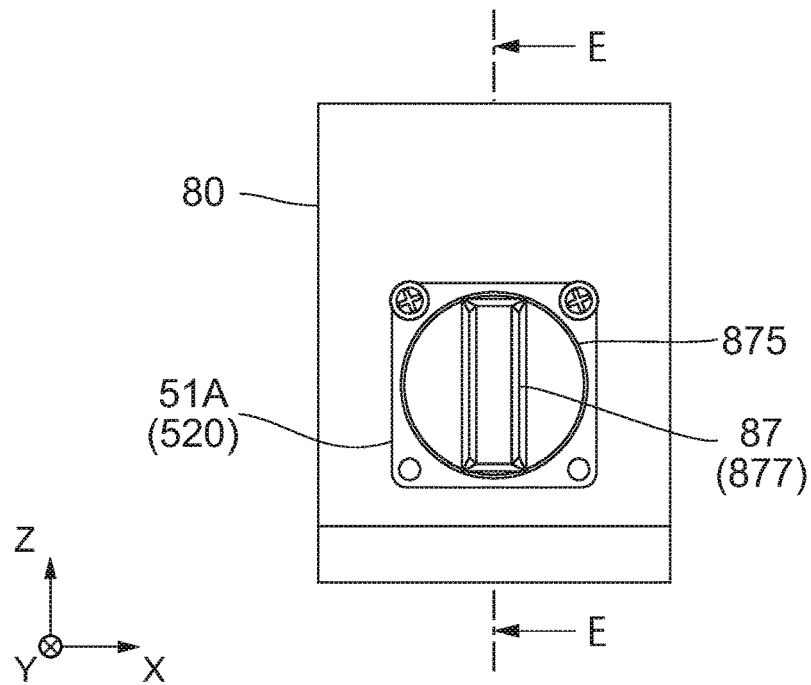
FIG. 31 is a rear view showing the jig and the receptacle connector of FIG. 30.
Figure 32:
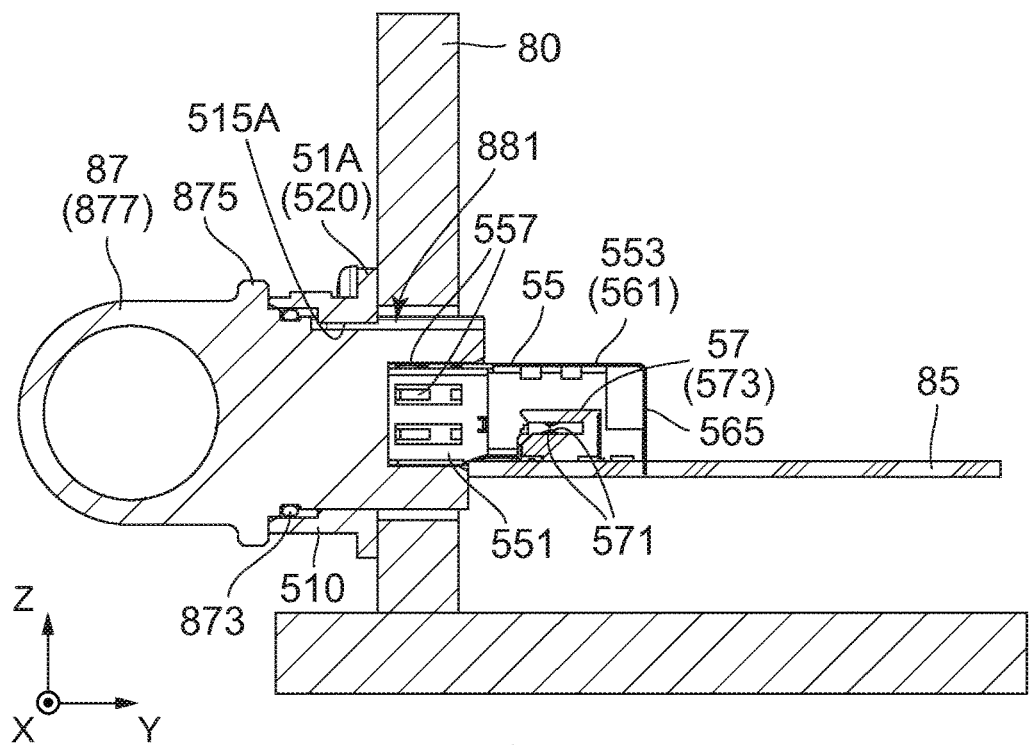
FIG. 32 is a cross-sectional view showing the jig and the receptacle connector of FIG. 31, taken along line E-E.
Figure 33:
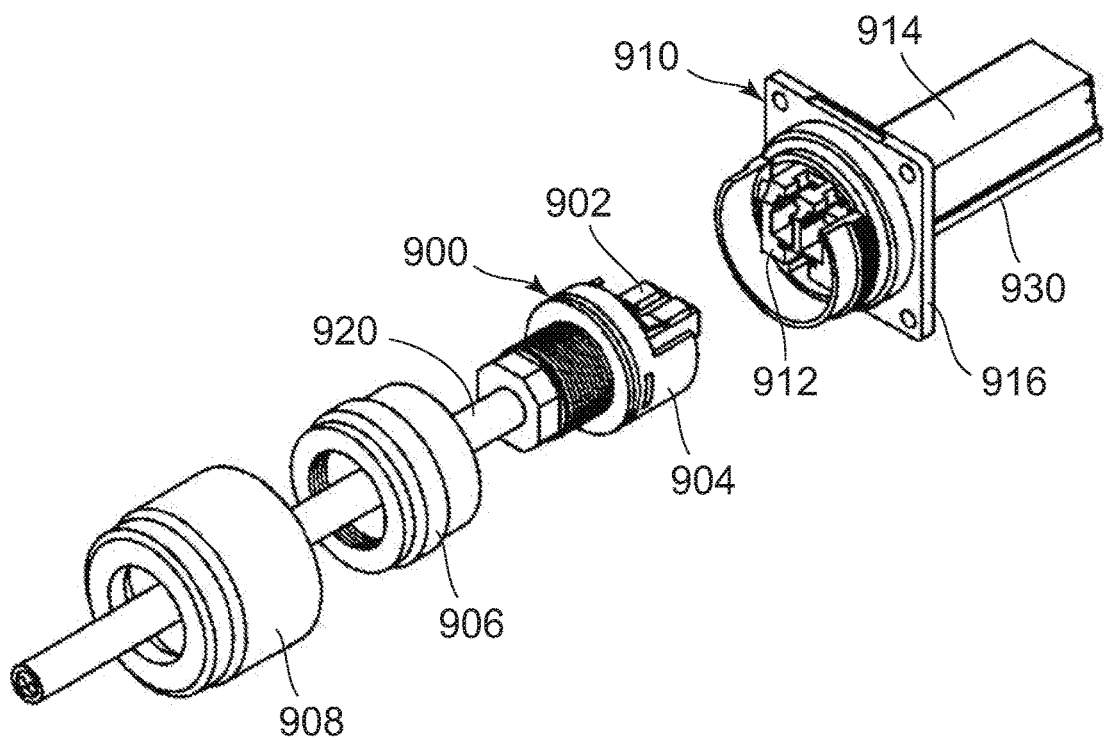
FIG. 33 is an exploded, perspective view showing a connector connection unit disclosed in Patent Document 1.
Figure 34:
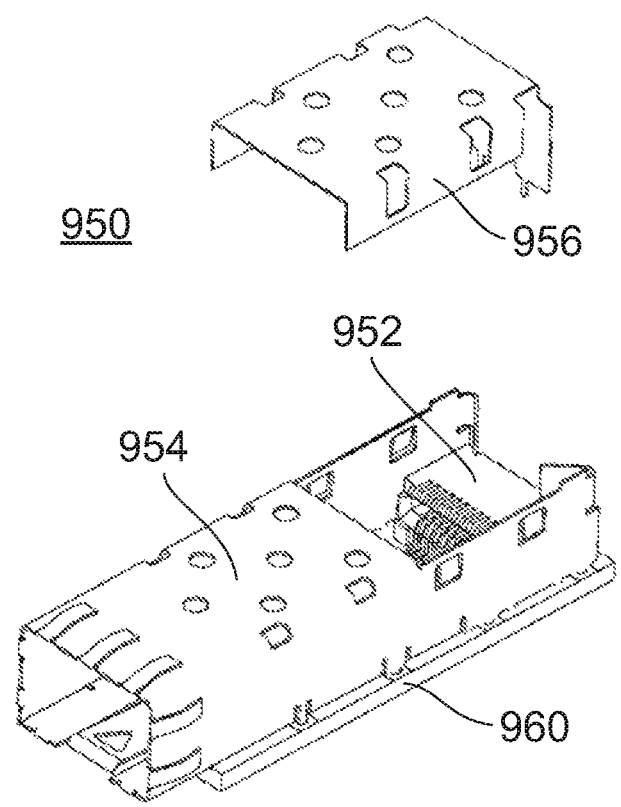
FIG. 34 is an exploded, perspective view showing an electric connector disclosed in Patent Document 2.

Referring to FIGS. 30 to 32, the insertion portion 871 of the jig 87 is inserted into the receptacle 51A and the aperture 81 of the case 80. At this time, the receptacle 51A is not fixed to the case 80, and the circuit board 85 is not fixed to the case 80. Upon inserting the insertion portion 871 of the jig 87 into the receptacle 51A, relative positions of the jig 87 and the receptacle 51A are decided by a mutual action between the guide protrusions 515A of the receptacle 51A and the guide grooves 881 of the jig 87. Moreover, upon inserting the insertion portion 871 into the aperture 81 of the case 80, the rear portion 551 of the cage 55 is received by the receiving portion 879 of the jig 87. A rear end of the cage 55 is brought into abutment with an innermost wall of the receiving portion 879, and thereby deciding relative positions of the jig 87 and the cage 55 in the front-rear direction. Alternatively, a rear end of the circuit board 85 and a front end of the jig 87 are brought into abutment with each other, and thereby deciding the relative positions of the jig 87 and the cage 55 in the front-rear direction. Moreover, the jig 87 is positioned in relation to the cage 55 in the surface direction perpendicular to the front-rear direction by an action of the plate springs 557 provided to the rear portion 551 of the cage 55. Simultaneously, the jig 87 is decided about a relative angle in relation to the cage 55 in the rotative direction with respect to the axis extending along the front-rear direction. As a result, the relative positions of the receptacle 51A and the cage 55 are decided by using the jig 87. In this state, the relative position of the circuit board 85 in relation to the case 80 is adjusted so that the flange portion 520 of the receptacle 51A comes into contact with a surface of the case 80. Then, the relative position of the circuit board 85 is fixed in relation to the case 80. After that, the receptacle 51A is fixed to the case 80. As mentioned above, a relative position of the cage 55 in relation to the case 80 and a relative position of the receptacle 51A in relation to the cage 55 can be decided.

In the aforementioned example, the plate springs 557 of the cage 55 are used to decide a relative position of the jig 87 in relation to the cage 55. However, the present invention is not limited thereto. As a substitute for the plate springs 557 of the cage 55, a plurality of plate springs may be arranged in the receiving portion 879. With this, the cage 55 can be simplified in structure and downsized.

Although the specific explanation about the present invention is made above referring to the embodiments, the present invention is not limited thereto. Those skilled in the art will recognize that other and further modifications may be made thereto without departing from the spirit of the invention. For example, though the side arm portions 533 of the receptacle 51 are not finally in contact with the cage 55 in the aforementioned embodiment, the side arm portions 533 may keep in contact with the cage 55. In that case, the positioning of the receptacle 51 can be carried out with a higher degree of accuracy.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector device comprising a plug connector and a receptacle connector which are mateable with each other along a mating direction, wherein:

the plug connector comprises a cable-holding portion, an optical module, and a first lock portion;

the cable-holding portion holds an optical fiber cable which transmits an optical signal;

the optical module comprises a small form-factor pluggable module including a photoelectric conversion portion and a first electric connector;

the first electric connector inputs and outputs electric signals into and from the photoelectric conversion portion;

the photoelectric conversion portion converts the optical signal and the electric signal to each other;

the receptacle connector comprises a second lock portion and a second electric connector;

the second lock portion engages with the first lock portion when the plug connector and the receptacle connector are mated with each other;

the second electric connector comprises a contact;

the first electric connector comprises a contact pad contactable with the contact;

the second electric connector is connected to the first electric connector when the plug connector and the receptacle connector are mated with each other;

the contact pad has a contactable range for being in contact with the contact;

the contactable range has a front end in the mating direction;

the first lock portion and the front end of the contactable range are apart from each other by a first distance in the mating direction;

the second lock portion and the contact of the second electric connector are apart from each other by a second distance in the mating direction;

the first electric connector and the second electric connector have an effective contact length therebetween in the mating direction;

the effective contact length represents a distance over which the contact is contactable with the contact pad;

a difference between the first distance and the second distance is equal to or less than the effective contact length;

the plug connector comprises an optical connector and a first shell;

the optical connector is attached to a distal end of the optical fiber cable;

the optical module is mated with the optical connector;

the first shell holds the optical connector and the optical module and covers the optical connector and the optical module at least in part;

within the first shell, movement of the optical module in the mating direction is regulated;

the first lock portion is provided to the first shell;

the optical module has a protruding portion which protrudes in a direction perpendicular to the mating direction;

the first shell has a first regulating portion and a second regulating portion; and the first regulating portion and the second regulating portion sandwich the protruding portion therebetween in the mating direction.

2. The connector device as recited in claim 1, wherein:

the first shell comprises a first member and a second member which hold the optical module and the optical connector, respectively;

the first regulating portion is provided to the first member; and the second regulating portion is provided to the second member.

3. The connector device as recited in claim 2, wherein:

the plug connector comprises a coupling nut to fasten the first member and the second member to each other; and in a state before the first member and the second member are fastened to each other, the coupling nut is attached to the second member to be movable in the mating direction.

4. The connector device as recited in claim 3, wherein:
in the state before the first member and the second member are fastened to each other, the first shell has an opening portion opening in a direction perpendicular to the mating direction; and
in the state before the first member and the second member are fastened to each other, the protruding portion is visible through the opening portion.

5. The connector device as recited in claim 4, wherein:
the first shell further comprises a first water stop portion and a second water stop portion;
the first water stop portion is attached to the first member and covers an entire circumference of the first member in a plane perpendicular to the mating direction;
the second water stop portion is attached to the second member and covers an entire circumference of the second member in a plane perpendicular to the mating direction; and
the opening portion is located between the first water stop portion and the second water stop portion in the mating direction.

6. The connector device as recited in claim 2, wherein:
the plug connector further comprises a support member having a plurality of plate springs; and
the support member supports the optical module to be in a floating state with respect to the first member in a plane perpendicular to the mating direction.

7. A connector device comprising a plug connector and a receptacle connector which are mateable with each other along a mating direction, wherein:
the plug connector comprises a cable-holding portion, an optical module, and a first lock portion;
the cable-holding portion holds an optical fiber cable which transmits an optical signal;
the optical module comprises a small form-factor pluggable module including a photoelectric conversion portion and a first electric connector;
the first electric connector inputs and outputs electric signals into and from the photoelectric conversion portion;
the photoelectric conversion portion converts the optical signal and the electric signal to each other;
the receptacle connector comprises a second lock portion and a second electric connector;
the second lock portion engages with the first lock portion when the plug connector and the receptacle connector are mated with each other;
the second electric connector comprises a contact;
the first electric connector comprises a contact pad contactable with the contact;
the second electric connector is connected to the first electric connector when the plug connector and the receptacle connector are mated with each other;
the contact pad has a contactable range for being in contact with the contact;
the contactable range has a front end in the mating direction;
the first lock portion and the front end of the contactable range are apart from each other by a first distance in the mating direction;
the second lock portion and the contact of the second electric connector are apart from each other by a second distance in the mating direction;
the first electric connector and the second electric connector have an effective contact length therebetween in the mating direction;
the effective contact length represents a distance over which the contact is contactable with the contact pad;
a difference between the first distance and the second distance is equal to or less than the effective contact length;
the plug connector comprises an optical connector and a first shell;
the optical connector is attached to a distal end of the optical fiber cable;
the optical module is mated with the optical connector;
the first shell holds the optical connector and the optical module and covers the optical connector and the optical module at least in part;
within the first shell, movement of the optical module in the mating direction is regulated;
the first lock portion is provided to the first shell;
the first shell surrounds an entire circumference of the optical module in a plane perpendicular to the mating direction;
the first shell and the optical module form a cage accommodation portion therebetween;
the cage accommodation portion extends in the mating direction;
the receptacle connector has a cage; and
when the plug connector and the receptacle connector are mated with each other, the cage is accommodated in the cage accommodation portion in part.

8. The connector device as recited in claim 7, wherein:
the receptacle connector further comprises a second shell which is attached to the case when used;
the second electric connector is fixed on a circuit board arranged in the case when used; and
the second lock portion is provided to the second shell to be located outside the case.

9. The connector device as recited in claim 8, wherein:
the cage is fixed on the circuit board when used;
the cage has conductivity and accommodates the second electric connector;
the second shell has conductivity; and
the second shell is attached to the cage so that a distance between the second lock portion and the second electric connector in the mating direction is equal to the second distance.

10. The connector device as recited in claim 9, wherein:
the second shell has an arm portion extending in the mating direction; and
the arm portion is attached to the cage and thereby fixes the distance between the second lock portion and the second electric connector at the second distance.

11. A plug connector mateable, along a mating direction, with a receptacle connector which comprises a mating lock portion and a mating electric connector, the plug connector comprising a cable-holding portion, an optical module, and a lock portion, wherein:
the cable-holding portion holds an optical fiber cable which transmits an optical signal;
the optical module comprises a small form-factor pluggable module including a photoelectric conversion portion and an electric connector;
the electric connector inputs and outputs electric signals into and from the photoelectric conversion portion;
the photoelectric conversion portion converts the optical signal and the electric signal to each other;
the lock portion engages with the mating lock portion when the plug connector and the receptacle connector are mated with each other;

the electric connector comprises a contact pad contactable with a contact of the mating electric connector;

the electric connector is connected to the mating electric connector when the plug connector and the receptacle connector are mated with each other;

the contact pad has a contactable range for being in contact with the contact;

the contactable range has a front end in the mating direction;

the lock portion and the front end of the contactable range are apart from each other by a first distance in the mating direction;

the electric connector and the mating electric connector have an effective contact length therebetween in the mating direction;

the effective contact length represents a distance over which the contact is contactable with the contact pad;

when the mating lock portion and the contact of the mating electric connector have a second distance therebetween in the mating direction, a difference between the first distance and the second distance is equal to or less than the effective contact length;

the plug connector comprises an optical connector and a first shell;

the optical connector is attached to a distal end of the optical fiber cable;

the optical module is mated with the optical connector;

the first shell holds the optical connector and the optical module and covers the optical connector and the optical module at least in part;

within the first shell, movement of the optical module in the mating direction is regulated;

the lock portion is provided to the first shell;

the optical module has a protruding portion which protrudes in a direction perpendicular to the mating direction;

the first shell has a first regulating portion and a second regulating portion; and the first regulating portion and the second regulating portion sandwich the protruding portion therebetween in the mating direction.

\* \* \* \* \*